(12) United States Patent
Mancini

(10) Patent No.: US 7,008,495 B2
(45) Date of Patent: Mar. 7, 2006

(54) METHOD AND PLANT FOR MANUFACTURING A BELT STRUCTURE, A BELT PACKAGE, AND A CROWN STRUCTURE FOR A VEHICLE TIRE

(75) Inventor: Gianni Mancini, Turin (IT)

(73) Assignee: Pirelli Pneumatici S.p.A., Milan (IT)

( * ) Notice: Subject to any disclaimer, the term of this patent is extended or adjusted under 35 U.S.C. 154(b) by 219 days.

(21) Appl. No.: 10/312,777

(22) PCT Filed: Jun. 27, 2001

(86) PCT No.: PCT/EP01/07313

§ 371 (c)(1),
(2), (4) Date: Dec. 30, 2002

(87) PCT Pub. No.: WO02/00421

PCT Pub. Date: Jan. 3, 2002

(65) Prior Publication Data

US 2004/0011454 A1 Jan. 22, 2004

Related U.S. Application Data

(60) Provisional application No. 60/216,495, filed on Jul. 6, 2000.

(30) Foreign Application Priority Data

Jun. 29, 2000 (EP) .................................. 00202280

(51) Int. Cl.
*B29D 30/46* (2006.01)

(52) U.S. Cl. ...................... 156/111; 156/117; 156/130; 156/264; 156/396; 156/397; 156/406.4; 156/907

(58) Field of Classification Search ................ 156/111, 156/117, 123, 124, 130, 133, 396, 397, 405.1, 156/406.2, 406.4, 260, 264, 259, 271, 906, 156/907
See application file for complete search history.

(56) References Cited

U.S. PATENT DOCUMENTS

| | | | |
|---|---|---|---|
| 1,961,725 A | * | 6/1934 | Abbott, Jr. .................. 156/398 |
| 2,754,953 A | | 7/1956 | Groncy |
| 3,591,439 A | | 7/1971 | LeBlond et al. |
| 3,947,308 A | | 3/1976 | Brinkley et al. |

(Continued)

FOREIGN PATENT DOCUMENTS

EP 0 580 142 1/1994

(Continued)

*Primary Examiner*—Geoffrey L. Knable
(74) *Attorney, Agent, or Firm*—Finnegan, Henderson, Farabow, Garrett & Dunner, L.L.P.

(57) ABSTRACT

A method for manufacturing a vehicle-tire belt structure includes preparing half-strips; splicing respective half-strips to form belt strips; moving the belt strips toward at least one assembly drum; and superposing portions of the belt strips to form a belt structure. Related methods for manufacturing vehicle-tire belt packages and crown structures are also disclosed. A plant for manufacturing a vehicle-tire belt structure includes an extrusion apparatus to form a fabric sheet; means to transport the sheet; a device for cutting the sheet to form multiple strips; a device for preparing first and second half-strips; means for transporting the half-strips; a device for splicing the first half-strips and the second half-strips to form belt strips; a device for cutting the belt strips into portions; and at least one assembly drum adapted to support the portions. Related plants for manufacturing vehicle-tire belt packages and crown structures are also disclosed.

29 Claims, 15 Drawing Sheets

U.S. PATENT DOCUMENTS

| | | | |
|---|---|---|---|
| 4,233,255 A * | 11/1980 | Moon | 264/40.4 |
| 4,877,468 A | 10/1989 | Siegenthaler | |
| 5,540,803 A * | 7/1996 | Miyamoto et al. | 156/396 |
| 6,139,668 A * | 10/2000 | Stokes et al. | 156/111 |
| 6,669,798 B1 * | 12/2003 | Okada et al. | 156/117 |

FOREIGN PATENT DOCUMENTS

| | | |
|---|---|---|
| GB | 580838 | 9/1946 |
| GB | 1 245 446 | 9/1971 |
| JP | 2001-105509 | 4/2001 |

\* cited by examiner

METHOD AND PLANT FOR MANUFACTURING A BELT STRUCTURE, A BELT PACKAGE, AND A CROWN STRUCTURE FOR A VEHICLE TIRE

CROSS-REFERENCE TO RELATED APPLICATIONS

This application is a national stage entry under 35 U.S.C. § 371 from International Application No. PCT/EP01/07313, filed Jun. 27, 2001, in the European Patent Office, the contents of which are relied upon and incorporated herein by reference; additionally, Applicant claims the right of priority under 35 U.S.C. § 119(a)–(d) based on patent application No. 00202280.4, filed Jun. 29, 2000, in the European Patent Office; further, Applicant claims the benefit under 35 U.S.C. § 119(e) based on prior-filed, copending provisional application No. 60/216,495, filed Jul. 6, 2000, in the U.S. Patent and Trademark Office.

BACKGROUND OF THE INVENTION

1. Field of the Invention

In a first aspect thereof, the present invention relates to a method for manufacturing a belt structure of a green tire for vehicles.

This invention also refers to a plant for manufacturing the belt structure, a method and a plant for manufacturing a belt package of a green tire incorporating the above-mentioned belt structure, as well as a method and a plant for manufacturing a crown structure of a green tire including the above-mentioned belt package.

2. Description of the Related Art

As is known, a green tire is essentially constituted by a composite structure obtained by assembling together a plurality of semi-finished products adapted to constitute a carcass comprising at least one airproof liner, a reinforcing ply, two bead wires to which the ply edges are associated after interposition of an elastomeric filling fixed to the radially outer surface of each bead wire, a belt structure arranged as a crown around the torically shaped carcass, a tread wrapped around the belt and a pair of axially opposite sidewalls, radially extending between the bead wires and the tread.

A further layer incorporating a plurality of circumferentially oriented reinforcing cords, otherwise known as zero degree cords, may be inserted between the belt structure and the tread.

In the following description and in the subsequent claims, the term "belt structure" is used to indicate a composite structure including at least a couple of radially superposed belt strips, provided with reinforcing cords parallel to one another in each strip and inclined with respect to the cords of the adjacent strip generally in a symmetrical manner with reference to the equatorial plane of the belt structure.

In the following description and in the subsequent claims, the term "belt package" is used to indicate the assembly constituted by a belt structure and an additional radially outer layer incorporating circumferentially oriented reinforcing cords.

Finally, in the following description and in the subsequent claims, the term "crown structure" is used to indicate a composite structure constituted by a belt package and a tread in its turn arranged as a crown around the additional layer of reinforcing strips of the belt package.

In the field of tire manufacturing, one of the requirements to be satisfied is notoriously that of imparting to the finished product high quality and long lasting characteristics, achieving at the same time a high production capacity of the manufacturing plant as a whole. In this connection, a critical factor which sharply influences the quality of the finished tire is constituted by the quality of the semi-finished products which form the tire structure once they have been assembled together.

The quality of the semi-finished products is in turn linked to the production methods and to the environmental conditions in which the semi-finished products are produced and optionally stored.

According to the state of the art, in the manufacturing of the belt package of the green tire, both the belt strips and the rubber mixture ribbon (or tape) incorporating the zero degree cords forming the above-mentioned additional reinforcing layer, are wound around spools to form overlapping layers and are subsequently stored until they have to be used in the production line and assembled on an assembly drum.

A first problem connected to this type of handling of the semi-finished products is essentially linked to possible variations of the adhesion, of the chemical-physical characteristics and of the dimensional characteristics of the semi-finished products, which take place both during the storing period and during the various handling steps which such semi-finished products undergo before being used in the production line.

During the storing period in which they are kept in spools, in fact, a change of the humidity and temperature conditions of the storing environment from those considered to be optimal may lead to an unwanted variation of the rubber stickiness, generally a reduction of the same, which makes in some cases numerous layers of the semi-finished product unusable with an ensuing waste of material.

A second problem connected to the methods of handling and storing the above-mentioned semi-finished products consists in the possible appearance of undesired deformations and stresses due to the weight of material, which generally determines a compression of the radially innermost layers of material in the spool, which compression influences in turn the quality of the final product in a negative manner. In the worst cases, such compression of the layers may cause the rejection of the material which may no longer be used.

Another problem related to the above-mentioned handling methods of the semi-finished products, in particular of the belt structure, of the layer incorporating the zero degree cords and of the tread, consists in the need to carry out a series of cumbersome operations of loading and unloading of the spools in the assembling machine, which require both a continuous need for labor intervention and continuous stops, all this to the detriment of the quality of the final product and of the productivity of the plant used for manufacturing the green tire.

SUMMARY OF THE INVENTION

The technical problem underlying the present invention is therefore that of providing a method and a plant for manufacturing a belt structure, a belt package and a crown structure of a green tire which enable the achievement both of the desired high and constant quality of the belt structure, of the belt package, of the crown structure and of the semi-finished products that constitute the same, and of a productivity increase of the global plant.

According to a first aspect of the invention, the above-mentioned technical problem is solved by a method for manufacturing a belt structure of a green tire for vehicles, comprising the steps of:

a) preparing, in a substantially continuous manner, a plurality of half-strips having a predetermined length, aligned along respective conveying directions and incorporating reinforcing cords substantially parallel to one another in each half-strip;
b) butt splicing, in a substantially continuous manner, said aligned half-strips, so as to obtain respective belt strips extending along said conveying directions;
c) supplying, in a substantially continuous manner, said belt strips to at least one assembly drum;
d) superposing on said at least one assembly drum portions having a predetermined length of each of said belt strips, so as to obtain a belt structure comprising radially superposed strips in which said reinforcing cords are parallel to one another in each strip and inclined in opposite direction with respect to the cords of the adjacent strip.

In the following description and in the subsequent claims, the term "length of the half-strips" is used to indicate the dimension of the half-strips measured in a direction parallel to the conveying directions of the half-strips.

In the following description and in the subsequent claims, the term "width of the half-strips" is used to indicate the dimension of the half-strips measured in a direction perpendicular to the conveying directions of the half-strips.

In the following description and in the subsequent claims, the expression "in a substantially continuous manner" is used to indicate the absence of intermediate storages of the semi-finished products between the various manufacturing steps which may change the chemical-physical and/or structural characteristics thereof in an undesired manner.

As an example, the expression "to prepare in a substantially continuous manner a plurality of half-strips" is used to indicate that the half-strips are produced and subsequently processed, i.e. butt spliced, without the introduction of an intermediate storage between their production and their subsequent butt splicing.

Advantageously, thanks to the realization of the belt strips in a substantially continuous manner and immediately upstream of an assembly drum, the method of the present invention enables not only to improve the product quality and the process productivity, but also to reduce the storage space and costs, as well as the material handling and labor costs with respect to the methods of the prior art.

Preferably, the method of the invention comprises the step of preparing, in a substantially continuous manner, a plurality of half-strips.

In this way, it is advantageously possible to prepare, in a substantially continuous manner and without any labor intervention, the half-strips intended to be spliced to each other to continuously form the belt strips.

According to a preferred embodiment of the invention, the half-strips are butt spliced on respective conveying means, arranged along the conveying directions of the half-strips, which conveying means may be constituted by conveyor belts, rolls, mobile tables or any other means known in the art and suitable for the purpose.

According to the method of the invention, the desired belt structure, comprising the radially superposed strips incorporating reinforcing cords parallel to one another in each strip and inclined in opposite direction with respect to the cords of the adjacent strip with reference to the center-line plane of the belt structure, can be obtained in two different ways.

In a first embodiment, the method of the invention provides for the formation, upstream of the assembly drum, of two belt strips substantially parallel to one another and already having the desired opposite inclination of the reinforcing cords with respect to the conveying direction of the half-strips structurally independent from one another and to the conveying direction of the belt strips obtained by splicing the half-strips.

According to such embodiment, the method of the invention comprises the step of turning each of the half-strips upside down, which half-strips, once butt spliced, form one of the belt strips.

The superposing step of the belt strips on the assembly drum is therefore carried out by tangentially feeding the strips either both at the top or both at the bottom of the assembly drum, which is rotated in the same direction during the winding of each strip.

In a second embodiment, the method of the invention provides for the formation, upstream of the assembly drum, of two belt strips substantially parallel to one another in which the reinforcing cords have the same inclination with respect to the conveying direction of the half-strips structurally independent from one another and to the conveying direction of the belt strips obtained by splicing the half-strips.

In this case, the superposing step of the belt strips on the assembly drum is carried out by tangentially feeding each strip, respectively one at the top and one at the bottom of the assembly drum, which is rotated in opposite directions during the winding of each strip.

Preferably, the belt strips are fed to the assembly drum by means of the above-mentioned conveying means.

In a preferred embodiment of the invention, the step of superposing the portions of each belt strip on the assembly drum is carried out by using a couple of assembly drums.

In this way, it is advantageously possible to increase the production rate of the plant for carrying out the method of the invention by reducing the time of each assembling cycle of the belt structure. It should be observed that the belt strips which constitute the belt structure, once they have been superposed on one another on the assembly drum, have a different circumferential development. It follows that one of the belt strips, and precisely the radially outer one, is used more than the other one. In order to take account of such different use of the two strips, it is convenient and preferable to discard, as a function of the material in excess detected by suitable sensors, one of the half-strips intended to constitute the radially inner belt strip. In any case, the amount of discarded material generated by said steps of the method of the invention (steps carried out in a substantially continuous manner and immediately upstream of the assembly drum) is however lower than the amount of discarded material normally generated by the production methods of the prior art and due to the aforementioned compression and mutual adhesion phenomena of the belt layers wound on the storing spool.

For the implementation of the above-mentioned method, the present invention provides a plant for manufacturing a belt structure of a green tire for vehicles.

According to a preferred embodiment, the plant of the present invention provides a butt splicing device of the structurally independent half-strips, which operates substantially by applying pressure perpendicularly to the surface of the half-strips to be spliced.

Advantageously, such a device reduces almost to zero the damaging strains exercised in longitudinal direction on the half-strips, which may cause undesired deformations of the latter.

In this embodiment, it is preferable to extrude the initial sheet of rubber-coated fabric incorporating the reinforcing cords in such a way as to provide the same with a lateral lip constituted by elastomeric material. In the subsequent operative steps of forming the half-strips starting from the initial sheet of rubber-coated fabric, said lip is positioned at one of the splicing edges of the half-strips and defines a seat for receiving with substantial mating engagement the end of the adjacent half-strip.

In this embodiment, the splicing device comprises a plate of suitable weight and size, movably supported above the conveying means of the half-strips, which plate promotes—by pressing each half-strip—the adhesion between one end of the half-strip and the underlying lip of the adjacent half-strip previously incorporated in the belt strip being formed.

Alternatively, the splicing device may comprise a plurality of counter-rotating upper and lower rolls supported above and, respectively, below the conveying means of the half-strips, said rolls traveling along a direction parallel to the edges of the half-strips to be spliced.

Alternatively, the splicing device may be of the comb-type, i.e. including a plurality of jaws adapted to grasp the edges of the adjacent half-strips to carry out the butt splicing thereof along a direction parallel to the longitudinal direction of the half-strips.

The plant of the invention enables the preparation of a belt structure of a green tire in a totally automated manner, limiting as much as possible the labor involved and without any need to store the semi-finished products, which are advantageously produced immediately before being assembled together to form the belt structure.

With the plant of the invention, the risks of quality variations of the belt structure related to possible variations of the chemical-physical characteristics of the semi-finished products and/or related to a variation of temperature and/or humidity of the warehouse or to a long permanence of the semi-finished products on the spools are also advantageously reduced to a minimum or substantially eliminated.

In a preferred embodiment, the plant of the invention is provided with an extrusion apparatus comprising an extrusion head adapted to supply in a substantially continuous manner a substantially continuous sheet of rubber-coated fabric incorporating a plurality of reinforcing cords on said conveying means, said plurality of reinforcing cords being supplied by a creel located upstream of said extrusion head.

Downstream of this extrusion apparatus, the plant according to the invention comprises a first cutting device operating on said sheet of rubber-coated fabric and adapted to obtain a plurality of strips from this sheet.

Preferably, the plant of the invention also comprises a half-strips preparation device including a transfer device of the strips obtained as described above, which transfer device is adapted to move the strips away from the conveying direction of the sheet of rubber-coated fabric, a second cutting device operating on said strips and adapted to form a plurality of half-strips, and a positioning device of the half-strips.

Advantageously, thanks to said features, the plant lay-out turns out to be independent from the cutting angle of the strips, so that a reduction in the area occupied by the plant is achieved with respect to the plants of traditional type; furthermore, the production of the strips turns out to be independent also from the cutting and positioning operations of the half-strips, maximizing in this way the plant productivity.

An additional advantage achieved by the invention consists in the increase of the production flexibility, with particular reference to the reduction in the time required to shift to a production of tires of different size, the operations required being limited—if it is not required to change the type of cord—only to the variation of the cutting angle of the sheet of rubber-coated fabric and/or to the cutting of a strip of a different length.

Furthermore, with respect to the prior art systems based on the use of belt strips prearranged and packed on spools, it is not necessary to store and handle the spools as well as the various supporting fabrics used, such as the sheets of release material (for example polyester or polyethylene) coupled to the belt strip before carrying out its winding on the spool.

In a preferred embodiment, the transfer device comprises at least one strip-supporting arm angularly movable between a first strip-receiving position located downstream of said first cutting device of the sheet of rubber-coated fabric and a strip picking-up position.

According to a preferred aspect, the supporting arm is provided with a strip-supporting oscillating table hinged to said arm and movable to and from said first cutting device.

In an alternative embodiment, the transfer device comprises strip-conveying means, for example a conveyor belt or any other kind of means having the same function, having a conveying axis which is substantially parallel to the cutting direction of the sheet of rubber-coated fabric and movable between the above-mentioned first strip-receiving position located downstream of the first cutting device and said strip picking-up position.

In a preferred embodiment, the half-strips preparation device of the invention comprises a positioning device of the half-strips adapted to pick up each of the strips from said strip picking-up position, to place the same in the aforesaid strip cutting position and to subsequently move the half-strips so obtained away from each other.

Conveniently, the positioning device of the half-strips is provided with catching means of the strip rotatably mounted about an axis perpendicular to the strip in such a way as to rotate each strip, if necessary, of a third predetermined angle with respect to the conveying direction of the sheet of rubber-coated fabric.

Preferably, the catching means of the strip are mounted on a supporting frame movably guided to and from the strip to be positioned.

Even more preferably, the positioning device of the half-strips is provided with two coplanar plates, each provided with strip catching means, which plates are driven away and towards each other.

Advantageously, such coplanar plates operate along a direction parallel to the upper face of the strip, therefore avoiding the creation of undesired stresses in the material making up the strip such as the stresses produced when the strip is handled by grasping the same by its edges with subsequent undesired strains, especially in longitudinal direction.

In an alternative embodiment, the half-strips preparation device is substantially constituted by the second cutting device and by the positioning device of the half-strips, which picks up each strip from the above-mentioned strip-receiving position and places the same directly in the second strip cutting position to form said half-strips.

In an embodiment of the plant and consistently with the method according to which the belt strips possess the required opposite inclination of the reinforcing strips already upstream of the assembly drum, the half-strips preparation device further comprises an upturning device of one of the half-strips, which is placed downstream of the second cutting device and upstream of the conveying means of one of the half-strips.

Preferably, the upturning device includes a plate provided with catching means of the half-strip, said plate being rotatably mounted on a respective supporting frame which is guided to and from the conveying means of the half-strip which is thus turned upside down.

According to a further aspect of the invention, the above-mentioned technical problem is solved by a method for manufacturing a belt package of a green tire for vehicles.

In an embodiment, the width of the layer incorporating the zero degree reinforcing cords may substantially be equal to the width of the belt structure, whereas its length is substantially equal to the circumferential development of the assembly drum.

Conveniently, means capable of applying a suitable pressure on the tread are used during the application of the tread on the belt package, in order to increase the adhesion of the tread to the belt package underneath and to strengthen the assembly thereof.

In a preferred embodiment, the layer incorporating the zero degree reinforcing cords may be formed by spirally winding around the belt structure at least one relatively narrow ribbon of rubber mixture, subsequently referred to as: tape, incorporating one or more reinforcing cords. Conveniently, this tape is wound in such a way as to obtain axially aligned spirals circumferentially extending around the bell structure substantially along its entire width.

For the implementation of the above-mentioned method for manufacturing a belt package of a green tire for vehicles, the invention provides a plant.

Preferably, the plant for manufacturing the belt package is provided with an extrusion apparatus, including an extrusion head, adapted to form in a substantially continuous manner the ribbon (or tape) of rubber mixture incorporating the zero degree reinforcing cords.

According to a further aspect of the invention, the above-mentioned technical problem is solved by a method for manufacturing a crown structure of a green tire for vehicles.

In a preferred embodiment, the tread is formed in a substantially continuous manner by extrusion.

For the implementation of the above-mentioned method for manufacturing the crown structure of a green tire for vehicles, the invention also provides a plant.

According to the invention, said plant comprises an extrusion apparatus for supplying a continuous tread sheet of rubber mixture from which the treads required for completion of the crown structure are produced, as well as conveying means for transferring said continuous tread sheet of rubber mixture towards an assembly drum, on which the previously formed belt package is supported.

Preferably, the above-mentioned conveying means of the continuous tread sheet of rubber mixture are provided with cooling means, for example with a set of serpentine tubes in which cold water circulates.

BRIEF DESCRIPTION OF THE DRAWINGS

Additional features and advantages of the invention will become more readily apparent from the description of some embodiments of a method for manufacturing a belt structure, a belt package and a crown structure of a green tire according to the invention, made with reference to the attached drawing figures in which, for illustrative and non limiting purposes, a plant for carrying out said method is shown.

In the drawings.

DETAILED DESCRIPTION OF THE EMBODIMENTS

Figure 1:
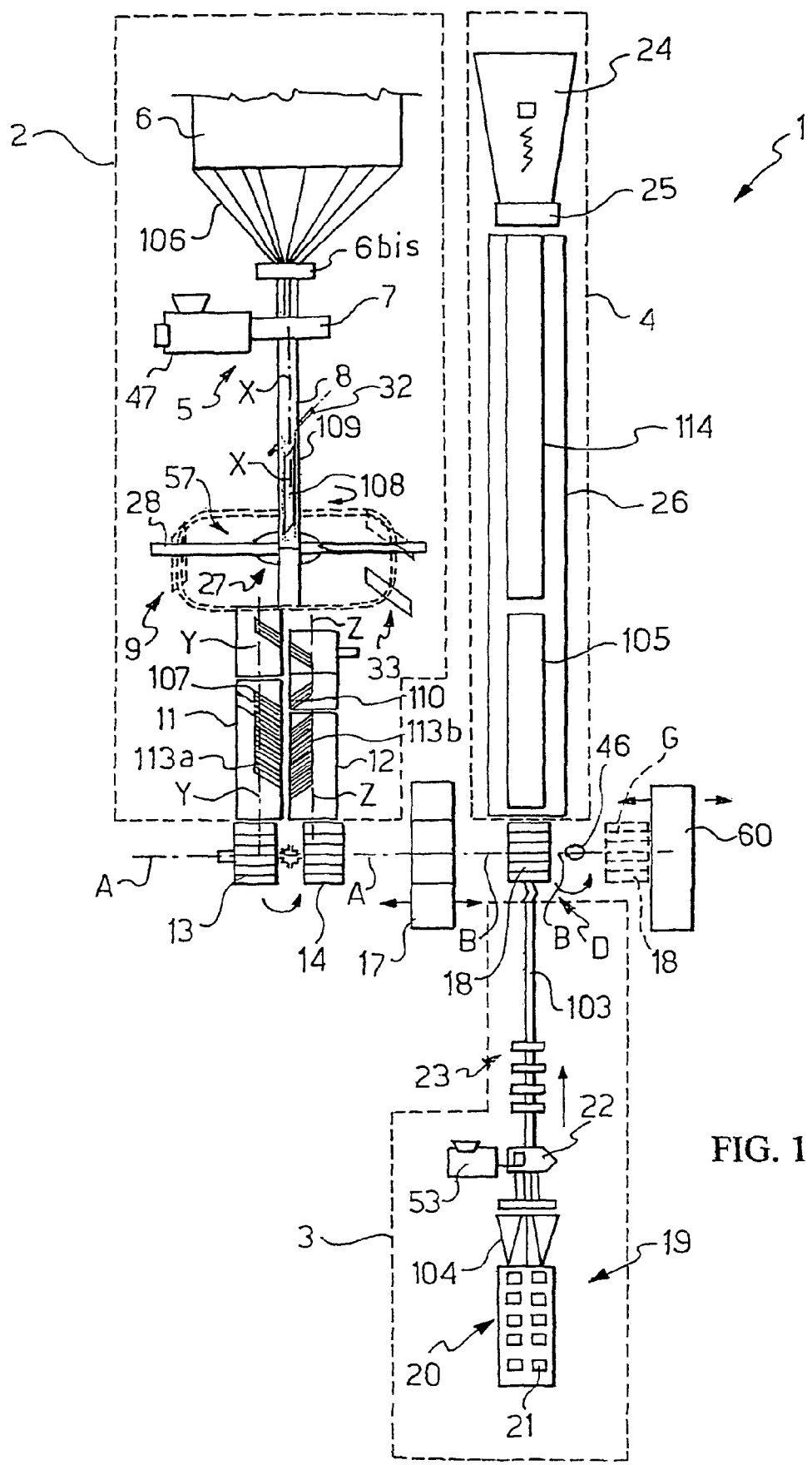
FIG. 1 schematically shows a plant for manufacturing a crown structure according to the present invention.

With reference to the schematic lay-out of FIG. 1, a plant according to the invention for manufacturing, in a substantially continuous manner, a crown structure of a green tire for vehicles is generally indicated at 1. The plant 1 comprises a plant 2 for manufacturing, in a substantially continuous manner, a belt structure, a production line 3 for manufacturing, in a substantially continuous manner, a ribbon 103 of limited width (tape) of rubber mixture comprising a plurality of reinforcing cords 104 and a production line 4 for manufacturing, in a substantially continuous manner, a tread 105.

In the illustrated example, the plant 2 comprises an extrusion apparatus 5, aimed at forming, in substantially continuous manner, a sheet 109 of rubber-coated fabric incorporating a plurality of reinforcing cords 106 substantially parallel to one another. The extrusion apparatus 5 is fed by a creel 6 which supplies the cords 106, made of a suitable reinforcing material, for example metal cords, to an extrusion head 7 positioned downstream of the creel 6 and to a comb-type device 6b is which sets the coplanarity and the parallelism of the cords 106; additionally, the extrusion head 7 is fed by a rubber mixture of suitable composition by means of an extrusion screw 47, conventional per se.

Immediately downstream of the extrusion head 7, conveying means 8 of the sheet 109 of rubber-coated fabric are provided, for example constituted by a conveyor belt, which means convey the sheet 109 of rubber-coated fabric along a predetermined conveying direction X—X (see FIG. 2) towards a half-strips preparation device, generally indicated at 9, which will be described in greater detail in the following with reference to FIGS. 2–6.

Figure 2:
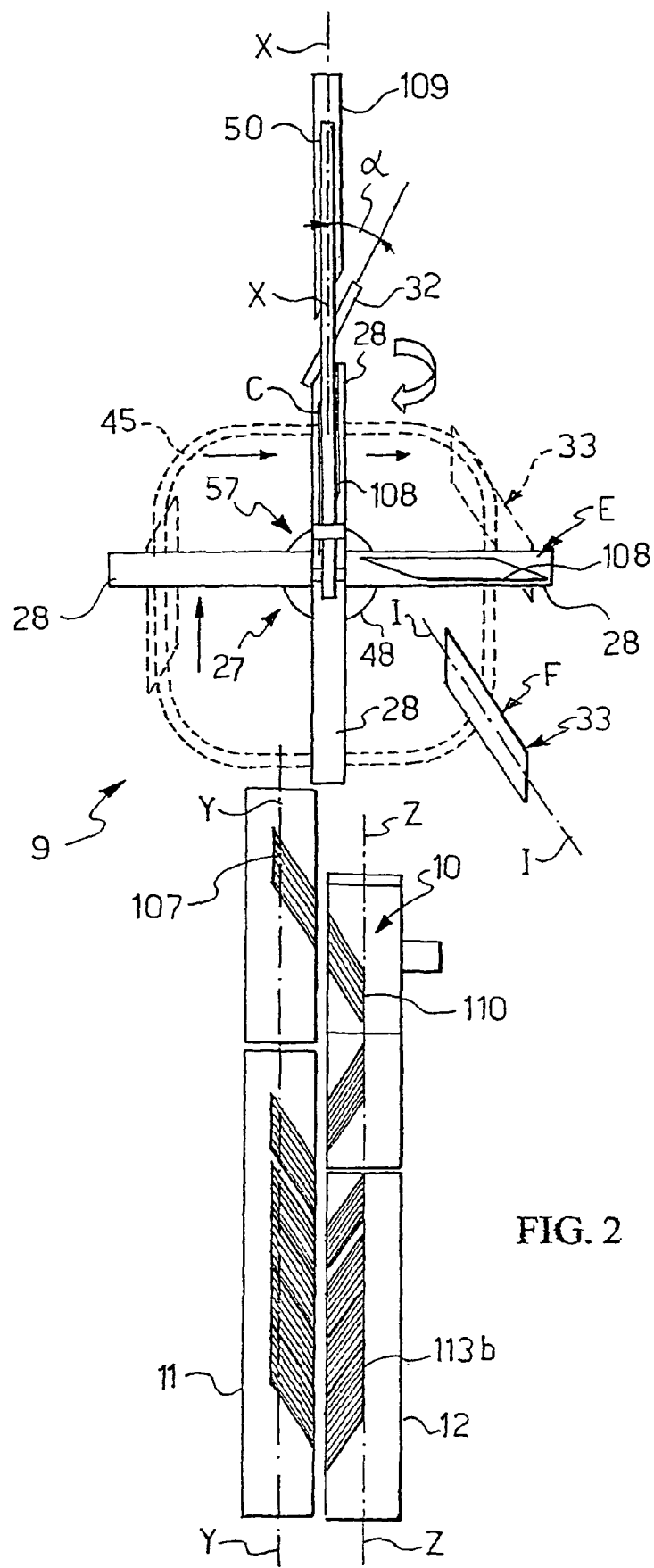
FIG. 2 is a schematic top view, in an enlarged scale, of a half-strips preparation device intended for forming a first and a second belt strip.
Figure 5:
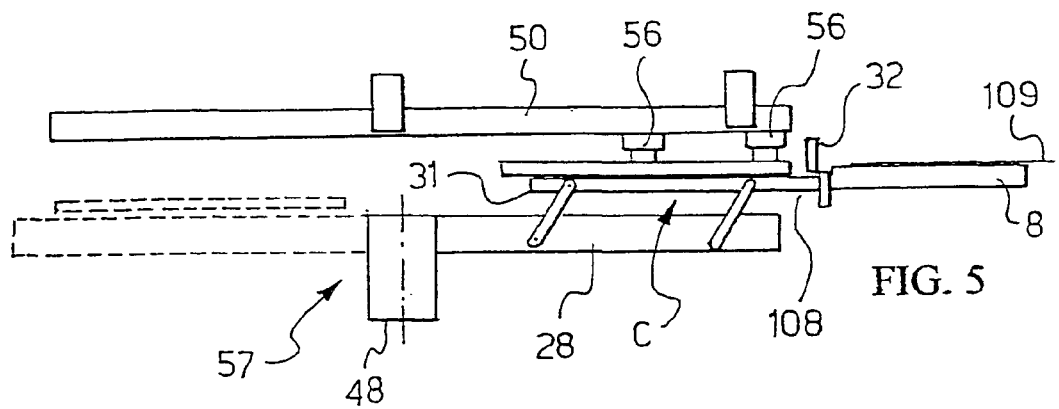
Figure 6:
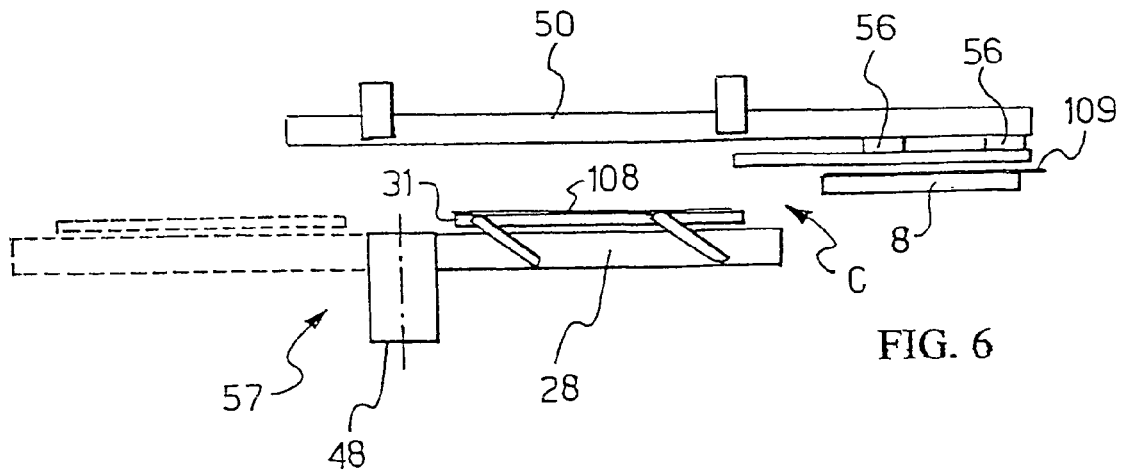

A first cutting device 32, schematically shown in FIGS. 1, 2 and 5, is provided upstream of the half-strips preparation device 9 for cutting the sheet 109 of rubber-coated fabric along a cutting direction forming a predetermined angle α with respect to the above-mentioned conveying direction X—X, so as to obtain a sequence of strips 108 having a predetermined length and aligned along said direction X—X.

Preferably, said angle α is comprised between 18° and 30° depending upon the size and the type of performance of the tire to be produced.

The main function of the half-strips preparation device 9 is that of splitting the strips 108, obtained from the sheet 109 of rubber-coated fabric, into a first plurality of half-strips 107 and into a second plurality of half-strips 110, aligned along respective conveying directions Y—Y and Z—Z.

To this end, the half-strips preparation device 9 comprises a transfer device, generally indicated at 27, to move each strip 108 away from a strip-receiving position C located downstream of the first cutting device 32 along the conveying direction X—X of the sheet 109 of rubber-coated fabric and to place the strip at a cutting position F, away from said direction X—X, adapted to readily enable the subsequent forming operations of the half-strips 107 and 110.

In particular, respective catching means 50 of the sheet 109 of rubber-coated fabric are provided upstream of the transfer device 27, which catching means are constituted in the illustrated example by a movable plate parallel to the conveyor belt 8 and provided with magnets 56, adapted to drag the sheet 109 of rubber-coated fabric away from the conveyor belt 8 and past the first cutting device 32 for a portion having a length equal to the length of the strip to be produced.

The catching means 50 may include, instead of the magnets 56, suitable means adapted to hold the sheet material such as a plurality of suction cups connected to a vacuum pump, particularly suitable when the cords 106 are made of a non-magnetic material, for example textile fiber.

In the subsequent description, for illustrative and non limiting purposes, magnetic catching means will be described.

In a first embodiment of the plant 2, the transfer device 27 comprises a multiple arm carousel 57 including four strip-supporting arms, all indicated at 28, angularly spaced of 90° from one another and cantilevered from a rotating support 48 driven by respective motor means 49.

This carousel 57 cooperates with a plate 50 which releases the strip 108, obtained from the first cutting device 32, down onto one of the aforementioned arms 28 placed in the strip-receiving position C substantially aligned with the conveyor belt 8 (i.e. with the conveying direction X—X); subsequently, the multiple arm carousel 57 places said arm with the relative strip 108 deposited thereon in a picking-up position E away from direction X—X and places a new arm 28 in the receiving position C for receiving a subsequent strip.

In order to simplify these transfer operations of the strips 108, each of the above-mentioned arms 28 may be provided on top with an oscillating table 31 (FIGS. 4–6) hinged thereto and driven by respective motor means of conventional type, not shown.

The oscillating table 31 rotates to and from the strip-receiving position C provided downstream of the first cutting device 32 and advantageously avoids any possible interference between the arms 28 and the conveyor belt 8.

In a preferred embodiment, the half-strips preparation device 9 comprises a positioning device 33 of the half-strips, adapted to pick up each strip 108 from the arm 28 at the picking-up position E and place the picked up strip 108 at an appropriate cutting position F wherein a second cutting device 34 is arranged.

If necessary, the positioning device 33 of the half-strips also rotates the strip 108 of a predetermined angle γ.

In the embodiment illustrated in the figures, in which the picking-up position E of the strips 108 forms an angle of 90° with the conveying direction X—X of the sheet 109 of rubber-coated fabric, the angle γ is comprised between 60° and 72°.

More particularly, the positioning device 33 of the half-strips places the strip 108 with respect to the second cutting device 34 at a position F in such a way that the cutting of the strip 108 occurs along a direction forming a predetermined angle β with respect to the longitudinal axis I—I of the strip 108.

Figure 3:
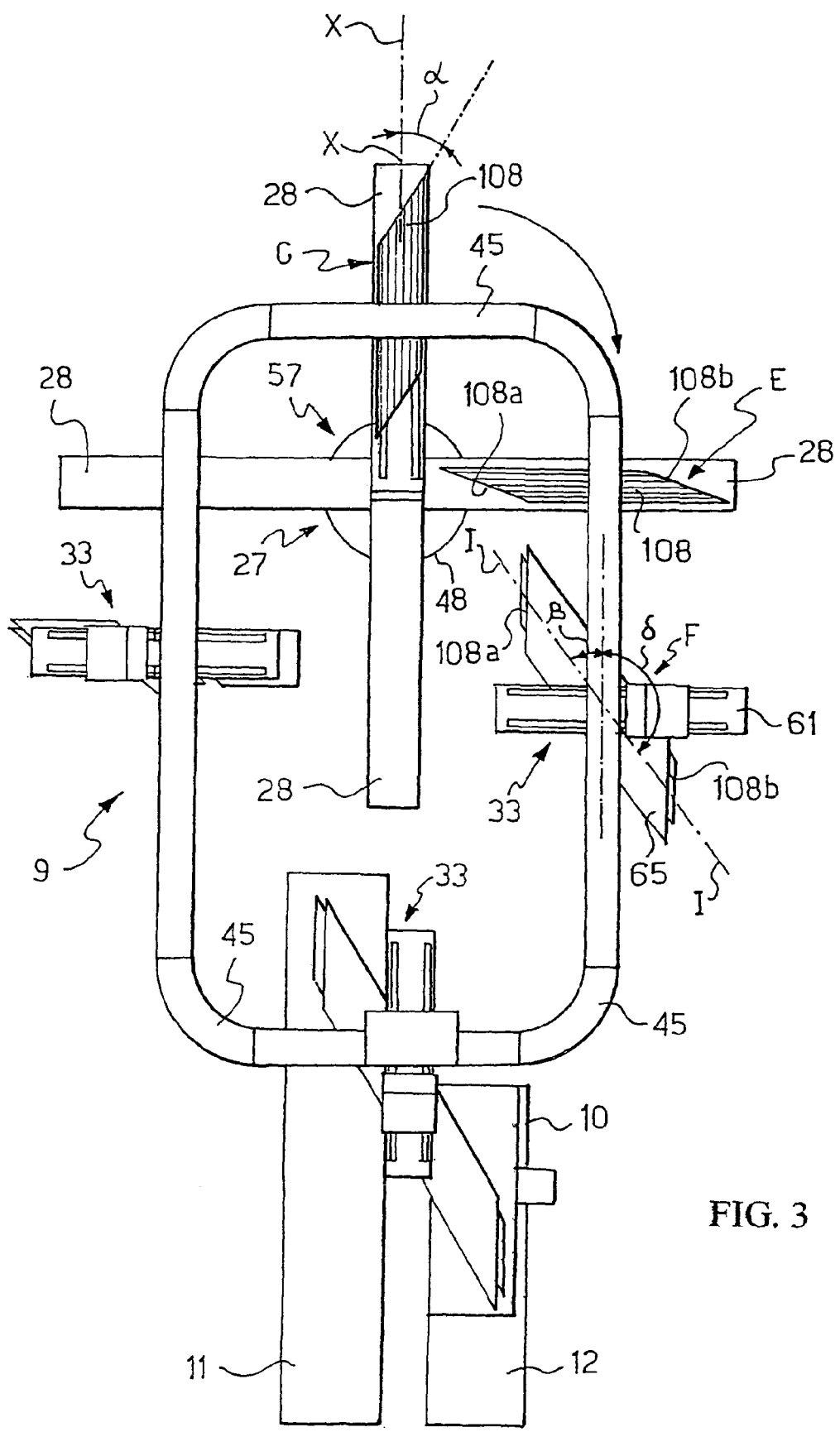
FIG. 3 schematically shows, in an enlarged scale, some details of the half-strips preparation device of FIG. 2.
Figure 4:
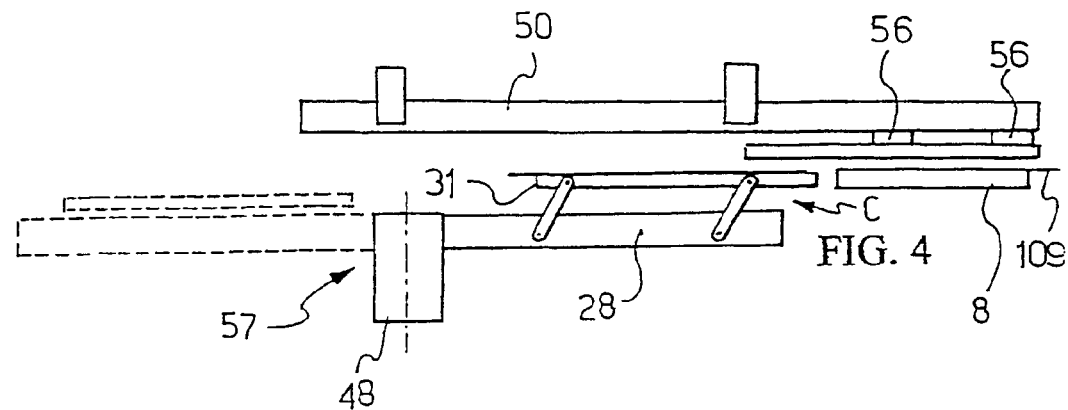
FIGS. 4, 5, and 6 are schematic views of respective operative conditions of catching means of a continuous sheet of rubber-coated fabric provided for upstream and cooperating with the half-strips preparation device of FIG. 2.

Said angle β is equal to the strip cutting angle α and is comprised between 18° and 30° depending upon the size and the type of performance of the tire to be produced. In this way, the cutting direction of each strip 108 is substantially parallel to the sides of the strip 108a, 108b which are longitudinally opposed along the direction of the reinforcing cords (FIG. 3).

Advantageously, thanks to the cooperation between the multiple arm carousel 57 and the positioning device 33 of the half-strips, the cycle time required to pick up each strip from the strip-receiving position C and to place the strip in the strip cutting position F is reduced, resulting in an increase of the plant productivity.

In a further embodiment, not shown, the carousel 57 may not be present: in this case, the positioning device 33 of the half-strips directly picks up the strip 108 from position C and subsequently places the same at the cutting position F.

At the cutting position F, the second cutting device 34 cuts each strip 108 in two half-strips having an appropriate width according to the offset to be given to the edges of the radially superposed belt strips.

In this preferred embodiment, the positioning device 33 of the half-strips is provided both with means suitable to pick up and transport the strip 108, and with means capable of positioning each of the half-strips 107 and 110 obtained by cutting the strip 108.

More particularly, the positioning device 33 of the half-strips comprises catching means 36 which are rotatably mounted on a supporting frame 37 guided to and from the second cutting device 34 and driven by respective motor means 43. In the example illustrated in FIGS. 7A, 7B and 8, the catching means 36 of the strips 108 of the positioning device 33 of the half-strips is constituted by a pair of coplanar plates 38a and 38b, for example of magnetic type, respectively supported by two slides 64a and 64b, slidably mounted on a supporting beam 65 and driven by a motor 66. The supporting beam 65 and the catching means 36 slidably mounted thereon are rotated about an axis P—P by a motor 72 positioned on a support 61 fixed to the frame 37 (see FIGS. 7A and 7B).

The displacement of the slides 64a and 64b enables to move the plates 38a and 38b away and towards each other along a horizontal direction substantially perpendicular to the cutting direction.

The frame 37 is in turn associated to a supporting trolley 58 moved by respective motor means 44 along an overhead track 45, forming a closed loop and supported in a conventional manner known per se above the half-strips preparation device 9.

In this way, the positioning device 33 of the half-strips may travel along a closed loop-shaped circuit and may be transferred from the strip cutting position F to a releasing position of the half-strips 107 and 110 on respective devices for their further processing as will be described further on.

As already explained, the half-strips preparation device 9 illustrated in FIGS. 2 and 3 and comprising a plurality of positioning devices 33 of the half-strips, advantageously increases the production capacity of the plant 2.

Figure 7A:
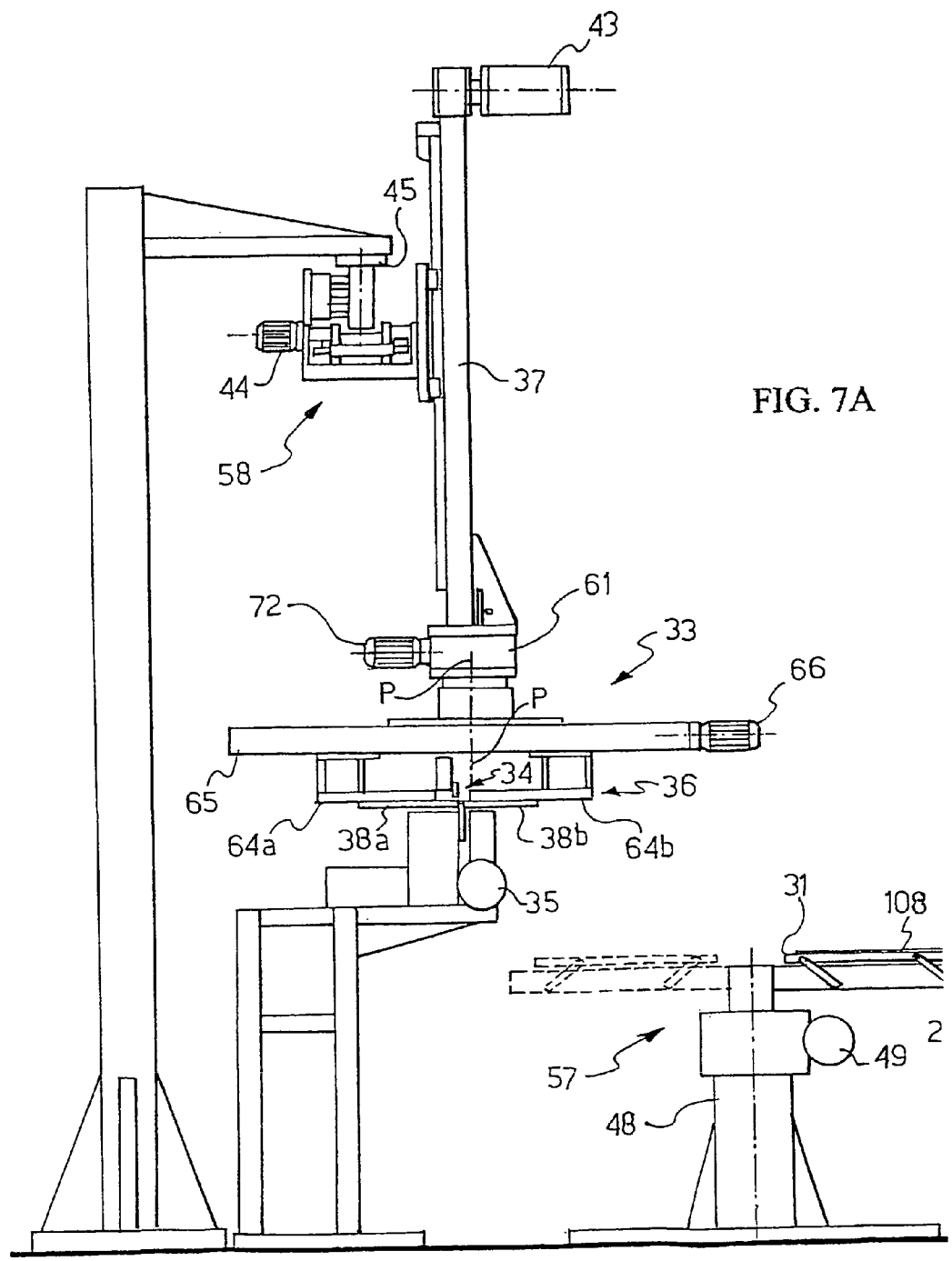
FIG. 7A is an elevational view of a strip transfer device, a second cutting device, and a positioning device of the half-strips which are part of the half-strips preparation device of FIG. 2.
Figure 7B:
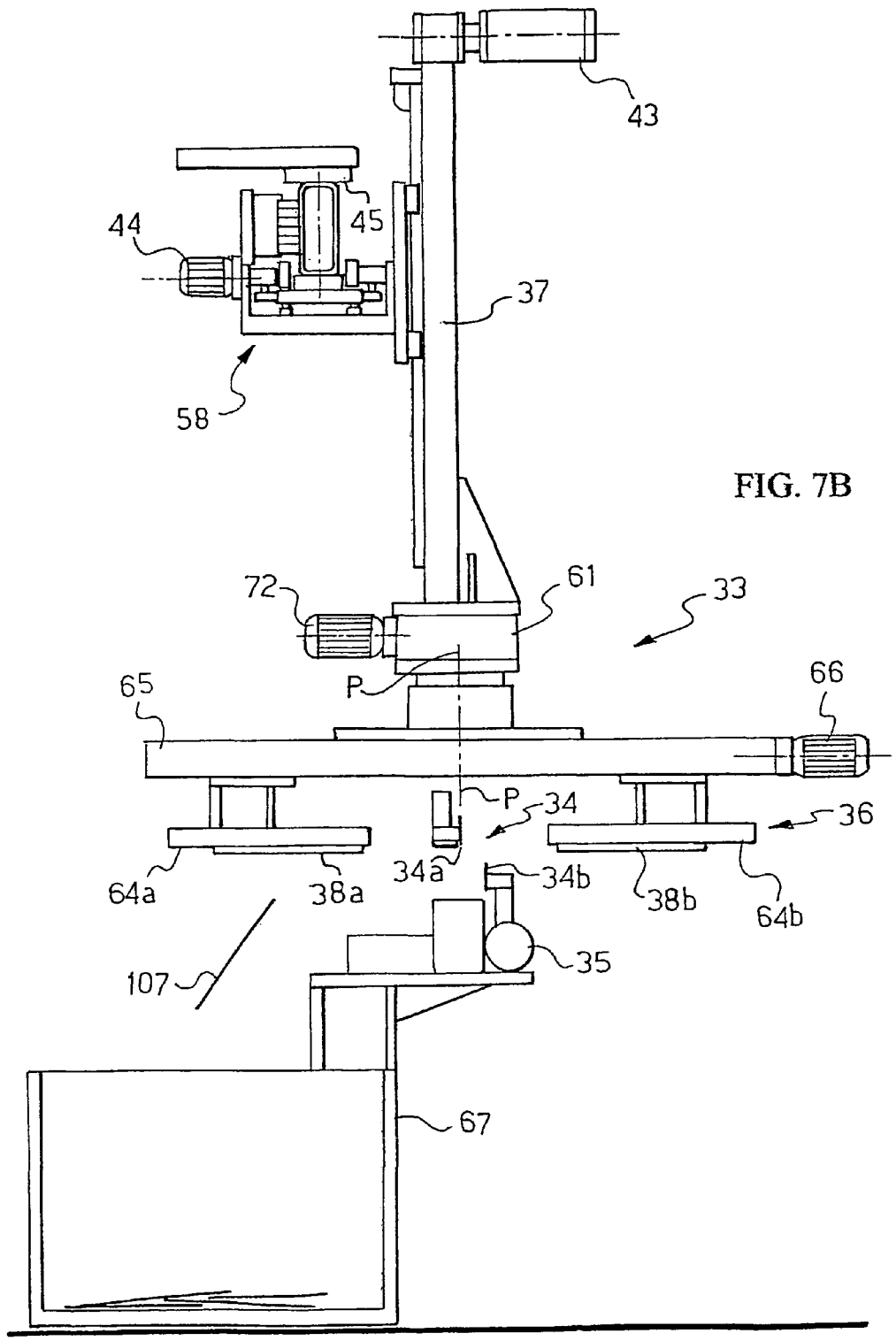
FIG. 7B is an elevational view of the positioning device of the half-strips of FIG. 7A and a collection container of the half-strips in excess.
Figure 8:
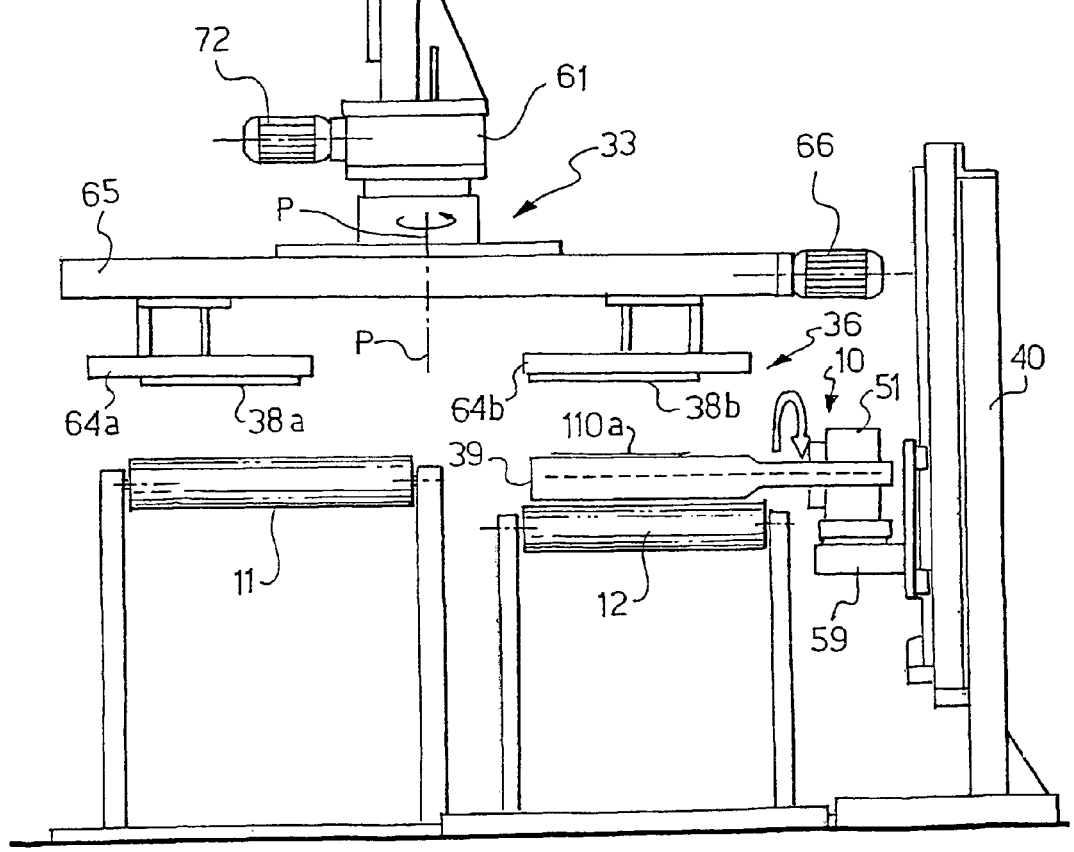
FIG. 8 is an elevational view of the positioning device of the half-strips of FIG. 7A and of a half-strip upturning device cooperating with the same.

The second strip cutting device 34, adapted to cut each strip 108 along the above-mentioned cutting direction, is schematically shown in FIGS. 7A and 7B.

Preferably, the cutting device 34 includes a system known in the art with the term "slitter" including two counter-rotating disks 34a and 34b, peripherally provided with a cutting edge, which disks are driven by a motor 35 along the cutting direction of the strip 108.

In the example illustrated and as already anticipated, the positioning device 33 of the half-strips advantageously rotates the strips 108 in their lying plane before carrying out their cutting, and places the half-strips 107 and 110, suitably moved away from one another, respectively on a conveyor belt 11 having a conveying axis Y—Y, or on another suitable conveying means, and on an upturning device 10.

In a preferred embodiment, the conveyor belt 11 and the upturning device 10, positioned immediately downstream of the second cutting device 34 supported at the cutting position F, are substantially parallel to the conveyor belt 8 of the initial sheet 109 of rubber-coated fabric in order to limit the size of the plant.

The upturning device 10 of the half-strip 110 exerts the function of turning one of the half-strips upside down, in this case the half-strip 110, in such a way that the reinforcing cords 106 thereof turn out to be symmetrically inclined with respect to those of the other half-strip (indicated at 107) with respect to the cutting direction of the strip 108.

In the example illustrated, the upturning device 10 comprises a plate 39 provided with suitable catching means, for example of magnetic type (FIGS. 8–11).

The plate 39 is rotatably mounted on a supporting frame 40 and is rotated around its transversal axis by respective motor means 51 to which the plate 39 is kinematically connected in a manner known per se.

The plate 39 is also associated to a supporting trolley 59 associated to the frame 40, which travels on the frame 40 along a vertical direction driven by respective motor means 52.

In this way, the trolley 59 and the plate 39 associated thereto can move vertically to and from a conveyor belt 12 positioned under the upturning device 10 and intended to receive and convey the half-strip 110 along a conveying direction Z—Z once the half-strip has been turned upside down.

In this way, a first and a second plurality of half-strips 107 and 110, aligned with one another and incorporating reinforcing cords 106 substantially parallel to one another and symmetrically inclined with respect to the conveying directions Y—Y and Z—Z of such conveyor belts, are placed on the conveyor belts 11 and 12 in a substantially continuous manner.

Respective butt splicing devices of the half-strips 107 and 110, previously placed along the above-mentioned belts 11, 12 by the positioning device 33 of the half-strips and, respectively, by the upturning device 10 are provided along each of the conveyor belts 11 and 12.

Said splicing devices, of conventional type not shown, may comprise a plurality of upper and lower counter-rotating rolls, respectively supported above and below the conveyor belts 11 and 12, which splice by applying pressure to the edges of adjacent half-strips or, alternatively, may comprise a plurality of jaws adapted to grasp the edges of the half-strips and splice the same by pressing them against each other.

Thus the above-mentioned splicing devices enable to obtain, starting from the aligned half-strips 107 and 110, respective belt strips 113a and 113b extending along the conveying directions Y—Y and Z—Z of the conveyor belts 11 and 12.

Figure 12:
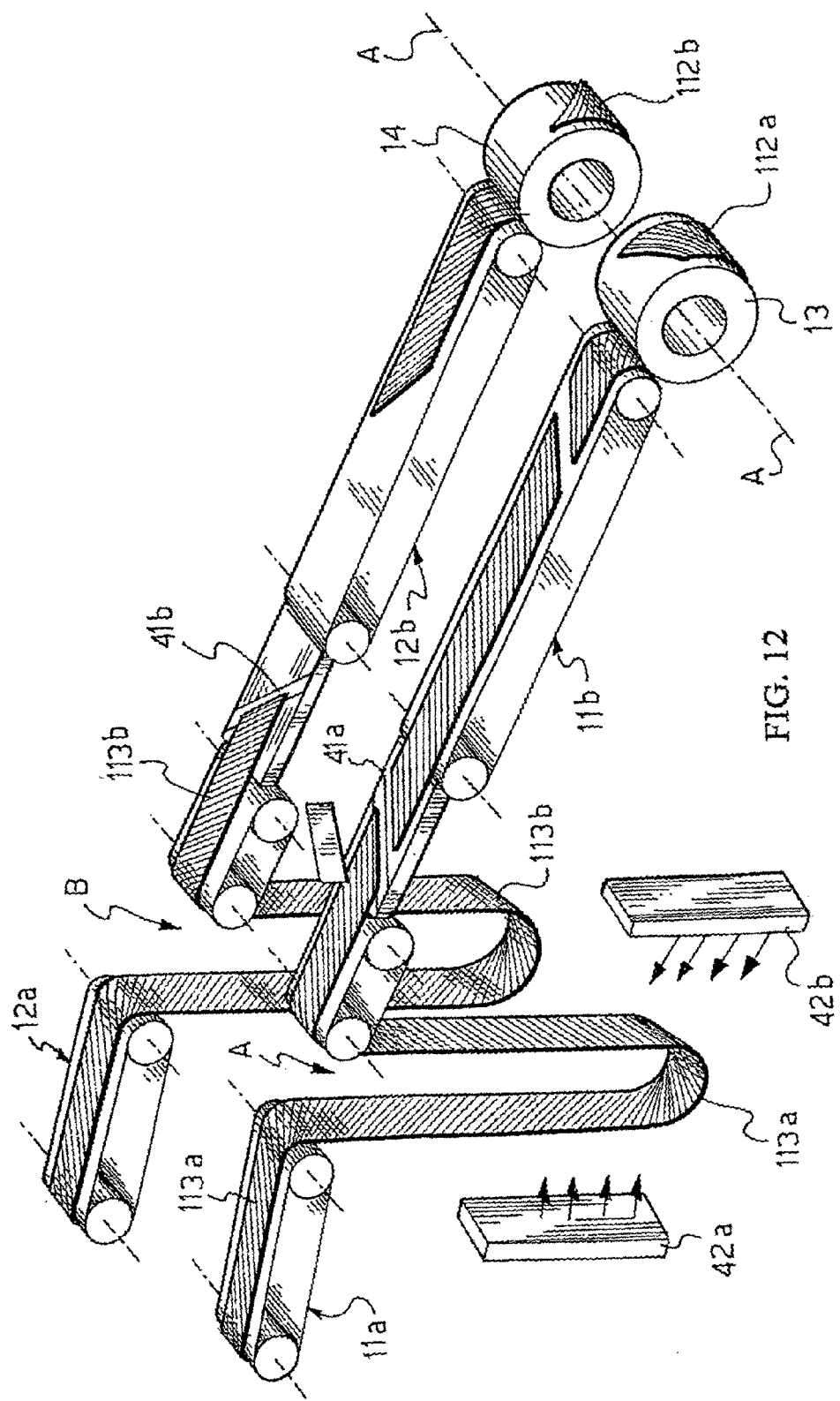
FIG. 12 is a schematic perspective view of the conveying and cutting means of the belt strips and a pair of assembly drums.

In a preferred embodiment, and as illustrated in FIG. 12, each of the conveyor belts 11 and 12 comprises two sections, respectively upstream sections 11a, 12a and downstream sections 11b, 12b spaced from each other to form respective spaces A, B adapted to contain a portion having a predetermined length of each of the belt strips 113a and 113b, known in the field with the term of "festoon".

More particularly, the festoon formed by the belt strips 113a and 113b carries out the advantageous function of storage unit adapted to absorb any possible different processing rates and/or use rates of the semi-finished products upstream and downstream of the conveyor belts 11 and 12.

In this embodiment, and in order to detect the length of the above-mentioned festoons, the plant 2 of the invention advantageously comprises a plurality of sensors suitably positioned at the spaces A, B housing the festoons formed by the belt strips 113a and 113b.

In FIG. 12, the sensors 42a and 42b intended for controlling the length of the festoon formed by the belt strip 113a in space A can be seen.

Respective cutting devices, schematically indicated at 41a and 41b in FIG. 12, are positioned along the conveyor belts 11 and 12 downstream of the spaces A and B for cutting the belt strips 113a, 113b in portions 112a and 112b having a predetermined length. In the illustrated example, each of the two cutting devices 41a and 41b comprises a shearer of conventional type.

Finally, the plant 2 comprises a pair of assembly drums 13 and 14, placed immediately downstream of the conveyor belts 11 and 12 and intended to carry out the assembling step of the belt structure starting from the belt strip portions 112a and 112b thus formed on the conveyor belts 11 and 12.

Figure 13:
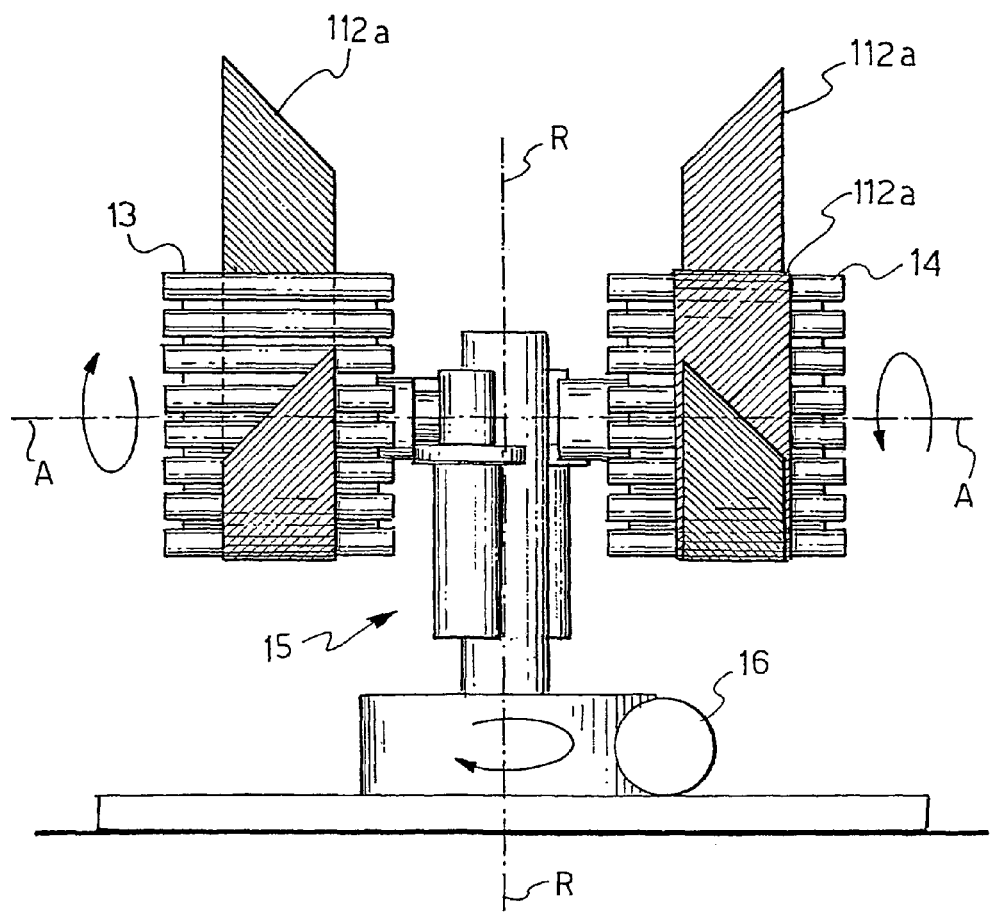
FIG. 13 is an elevational view of a device for supporting and angularly positioning the assembly drums of FIG. 12.

In the illustrated example, the drums 13 and 14 are coaxially aligned along a rotation axis (A—A) and are placed on diametrically opposite sides of a device 15 for supporting and angularly positioning the drums which is driven by respective independent motor means 16 (FIG. 13).

Advantageously and as will be better apparent in the following, the device 15 switches the drums 13 and 14 with one another at the end of each assembling operation of a belt strip carried out thereon in order to substantially reduce the assembling cycle time of the belt structure with respect to a single drum.

In this embodiment, the belt structure is preferably assembled on the drum 13 or 14 which is substantially aligned with the conveyor belt 12 in a position referred to hereinbelow as assembling position. In this embodiment, in fact, the belt strip 113a is used to form the radially inner strip of the belt structure, whereas the belt strip 113b is used to form the radially outer strip of the belt structure.

As indicated above, the above-mentioned plant 2 for manufacturing the belt structure of the green tire cooperates, within the area of the plant 1, with the production line 3 for preparing the tape 103 incorporating the reinforcing cords 104 and with the production line 4 for preparing the tread 105 to produce, respectively, the belt package and the final crown structure.

To this end and as illustrated in FIG. 1, the plant 1 comprises a first transfer device 17, known per se and from now on indicated as a transfer ring, adapted to transfer the belt structure produced in the plant 2 from the above-mentioned assembling position of the drums 13 and 14 onto a third assembly drum 18 on which the crown structure is assembled.

Preferably, the assembly drum 18 has a rotation axis B—B substantially aligned with the rotation axis A—A of the drums 13 and 14 in order to reduce the overall size of the plant 1 and to facilitate the transfer operations of the belt structure.

Advantageously, the production line 3 of the tape 103 and the production line 4 of the tread 105 are positioned in the plant 1 immediately upstream of the assembly drum 18, therefore avoiding any need to store these semi-finished products.

The production line 3 of the tape 103 essentially comprises an extrusion apparatus 19, adapted to form, in a substantial continuous manner, a narrow ribbon of rubber mixture (the tape) incorporating a plurality of reinforcing cords 104, as well as means to guide the tape produced in this way towards the assembly drum 18. This means include cooling and storing means, such as a set of rolls 23.

The extrusion apparatus 19 is fed by a creel 20 provided with a plurality of spools, all indicated at 21, which supplies the cords 104 to an extrusion head 22 fed with a rubber mixture of suitable composition by means of a conventional extrusion screw 53 known per se.

Conveniently, the cords 104 are made of a suitable reinforcing material, for example a textile material, such as polyamide, or metal.

The assembly drum 18 is preferably equipped with means, conventional per se and not shown, adapted to facilitate the winding of the tape 103 on the belt structure already prepared on the drum 18 (said means being constituted, for example, by one or more pressing rolls) and to cut the tape 103 once the latter has formed the reinforcing layer including the zero degree cords.

In an embodiment, this cutting means may be constituted by a known cutting mechanism of the pneumatic shear type.

The production line 4 of the tread 105 comprises an apparatus 24, adapted to extrude or form, in a substantially continuous manner, a tread sheet 114 of rubber mixture aimed at constituting the tread 105, as well as means for conveying the continuous tread sheet 114 towards the assembly drum 18, such as a conveyor belt 26.

The apparatus 24, which in the illustrated example includes an extrusion screw and an extrusion head 25 of conventional type, only schematically represented, is fed by a rubber mixture of suitable composition.

Preferably, the conveyor belt 26 is provided with suitable cooling means, such as a set of serpentine tubes through which cold water circulates, intended for cooling the continuous tread sheet 114 from the temperature the sheet has when it leaves the extrusion or forming head (generally equal to approximately 80° C.) down to a temperature suitable for carrying out the subsequent processing of the tread sheet 114 (conveniently in the order of approximately 40–45° C.).

Cutting means, conventional per se and not shown, are also provided along the conveyor belt 26 for cutting the continuous tread sheet 114 in portions having a predetermined length corresponding to the circumferential development of the tread of the tire in production or to a submultiple thereof.

In this way, it is possible to obtain a set of treads 105 (illustrated in FIG. 1) aligned along the conveyor belt 26 immediately upstream of the assembly drum 18.

In an alternative embodiment of the method of the invention, each tread 105 may be cut from the continuous tread sheet 114 during the winding operations around the assembly drum 18 by means of conventional cutting means known per se and not shown.

Similarly to what has been indicated above with reference to the tape 103, the assembly drum 18 is preferably equipped with means, conventional per se and not shown, adapted to facilitate the application of each tread 105 as a crown around the reinforcing layer including the zero degree cords 104.

As an example, said means may be constituted by one or more pressing rolls acting on the tread 105.

Finally, the plant 1 includes a positioning device 46 for positioning the assembly drum 18, adapted to move the drum by rotating the latter of 180° about a vertical axis perpendicular to the rotation axis B—B of the drum 18, from an assembling position (indicated at D in FIG. 1) of the crown structure, to a picking-up position (indicated at G in FIG. 1, wherein the drum 18 is indicated by a dotted line) of said structure by a second transfer ring 60.

This second transfer ring 60 transfers the crown structure towards a so-called first phase assembling line, not represented, on which line the cylindrical carcass sleeve adapted to be torically shaped and assembled with the crown structure is prepared.

With reference to the above-mentioned plant, a first embodiment of the method according to the invention for manufacturing a belt structure of a green tire comprises the following steps.

In a first step, the sheet 109 of rubber-coated fabric incorporating the reinforcing cords 106 is formed in a substantially continuous manner by means of the extrusion apparatus 5, which sheet—once it has left the extrusion head 7—is transported by the conveyor belt 8 towards the strip preparation device 9 along the conveying direction X—X.

In a subsequent step and immediately upstream of the half-strips preparation device 9, the sheet 109 of rubber-coated fabric is picked up by the catching means 50 which places the same at the first cutting device 32 that cuts the sheet 109 of rubber-coated fabric along a direction forming a predetermined angle α (for example equal to approximately 30°) with respect to the conveying direction X—X.

In this way and as a result of subsequent cuts of the sheet 109 of rubber-coated fabric, a plurality of strips 108 having a predetermined length, aligned with one another along the direction X—X, is obtained.

In a subsequent step, each strip 108 is transferred to a cutting position F away from the above-mentioned direction X—X by means of the strip transfer device 27, for example by means of the multiple arm carousel 57 and of the positioning device 33 of the half-strips cooperating with the same.

In this embodiment, the one of the arms 28 of the multiple arm carousel 57 which is located at the strip-receiving position C and which supports the strip 108 to be transferred, is rotated of approximately 90° towards the picking-up position E of the strip 108, position at which the positioning device 33 of the half-strips intervenes.

The positioning device 33 picks up the strip 108 resting on the rotated arm 28 (at picking-up position E) by means of the magnetic plates 38a and 38b and rotates the strip 108 of a predetermined angle γ with respect to the direction X—X (for example equal to approximately 30°) until it brings the strip 108 to the required cutting position F.

Once the positioning device 33 of the half-strips has picked up the strip 108, the multiple arm carousel 57 is further rotated of 90° so as to place other arms 28 respectively at the strip-receiving position C and at the picking-up position E, thereby repeating the previously described operations.

In a subsequent step, the strip 108 held at the cutting position F by the positioning device 33 of the half-strips is then cut in two parts by the second cutting device 34 along a direction forming an angle β equal to the predetermined angle α (for example, 30°) with respect to the longitudinal axis I—I of the strip.

In this way, two half-strips are obtained, respectively left 107 and right 110 with respect to the cutting direction, not necessarily of the same width, in the sense that the half-strip which will constitute the radially inner belt strip of the tire (the half-strip 107, according to the illustrated example) preferably has a width greater than the width of the half-strip which will constitute the radially outer belt strip (the half-strip 110).

In a subsequent step, the half-strips 107 and 110 are suitably moved away from each other along a direction substantially perpendicular to the cutting direction by moving the plates 38a and 38b of the positioning device 33 of the half-strips away from each other.

Subsequently, the half-strips 107 and 110 thus moved away are released by said device 33 onto the conveyor belt 11 and, respectively, onto the upturning device 10.

Once the half-strips 107 and 110 have been released, the positioning device 33 of the half-strips may move forward along the closed loop-shaped track 45 and return to the picking-up position E of a new strip 108 so as to repeat the previously described operations.

In an additional step of this embodiment of the method according to the invention, the half-strip 110 is taken, lifted and turned upside down by the magnetic plate 39 of the upturning device 10 in such a way as to obtain an inclination of the reinforcing cords 106 symmetrical with respect to that of the cords 106 of the half-strip 107 with reference to the above-mentioned cutting direction of the strip 108.

Figures 9, 10:
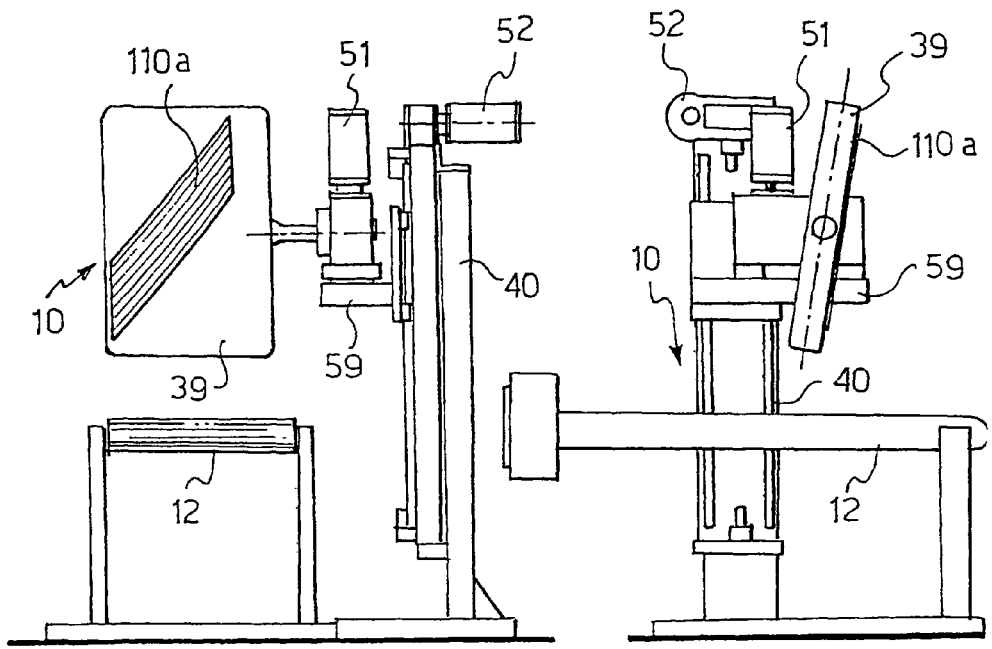
FIGS. 9, 10, and 11 are elevational views of the half-strip upturning device of FIG. 8 in respective operative conditions thereof.
Figure 11:
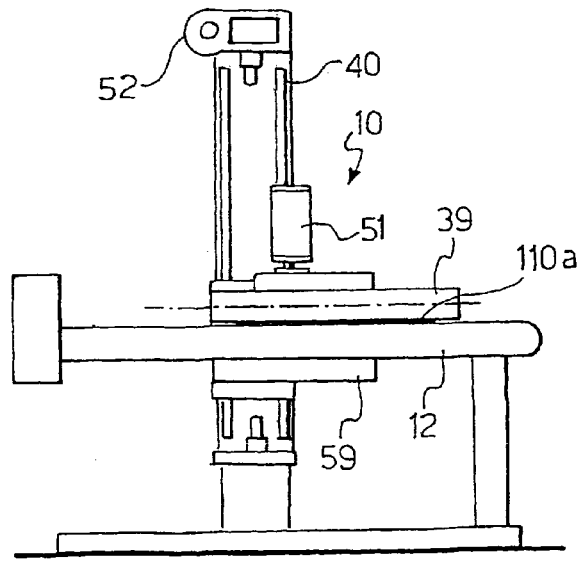

After this upturning step of the half-strip 110, the magnetic plate 39 is demagnetized in order to release the half-strip 110 turned upside down onto the conveyor belt 12 (FIGS. 9–11).

At the end of the above-mentioned steps, a plurality of first and second half-strips 107, 110 are therefore obtained in a substantially continuous manner, aligned with one another along the conveyor belts 11 and 12 and incorporating respective reinforcing cords 106 symmetrically inclined with respect to the conveying directions Y—Y and Z—Z of each of the above-mentioned belts 11 and 12.

In a further step of the method, said half-strips 107 and 110 are butt spliced to each other in order to form in a substantially continuous manner respective continuous belt strips 113a and 113b extending on the conveyor belts 11 and 12 along the above-mentioned conveying directions Y—Y and Z—Z.

The butt splicing between subsequent half-strips 107, 110 takes place by approaching the edges of adjacent half-strips thanks to a pressure applied, along the entire edge, by the splicing device, for example of the counter-rotating roll type, supported above and/or below the conveyor belts 11 and 12.

In the non limiting illustrated example, the belt strip 113a formed on the belt 11 is used to form the radially inner layer of the belt structure, while the belt strip 113b formed on the belt 12 is used to form the radially outer layer of the belt structure.

In a preferred embodiment, the method of the invention comprises the additional step of discarding one of the half-strips 107 used to form the radially inner belt strip 113a on the basis of a signal sent by the sensors 42a, 42b delegated to detect the length of the festoon formed by said belt strip 113a in the storage space A defined between the sections 11a and 11b of the belt 11.

Preferably, this discarding step is carried out by the positioning device 33 of the half-strips which, instead of releasing the half-strip 107 in excess on the belt 11, holds the same on the magnetic plate 38a and then releases the half-strip 107 into an appropriate collection container 67 out of line (FIG. 7B). Alternatively, and provided that the half-strips 107, 110 are of the same width, it is possible to avoid the elimination of the half-strip in excess by incorporating the two half-strips in the same belt strip.

In a further step, the belt strips 113a, 113b are cut to measure by the cutting devices 41a and 41b in order to obtain the portions 112a, 112b which will be subsequently superposed on the assembly drums 13 and 14.

In this embodiment of the method and since the reinforcing cords 106 of the belt strips 113a and 113b already have an opposite inclination with respect to the conveying directions Y—Y and Z—Z, such superposing step of the portions 112a, 112b is carried out according to the following steps, as illustrated in FIG. 13:

i) applying the radially inner belt strip portion 112a on the first assembly drum 13, by tangentially feeding the strip portion 112a at the bottom of the drum 13;
ii) switching the two drums 13 and 14 with one another by rotating of 180° the device 15 for supporting and angularly positioning the drums about an axis R—R perpendicular to the axis A—A of rotation of the above-mentioned drums;
iii) applying the radially outer belt strip portion 112b on the radially inner belt strip portion 112a, by tangentially feeding the strip portion 112b at the bottom of the drum 13, thereby forming the belt structure on the drum positioned in the above-mentioned assembling position, iv) applying a new radially inner belt strip portion 112a on the second assembly drum 14, by tangentially feeding the strip portion 112a at the bottom of the drum 14 and
v) cyclically repeating steps i) to iv).

The steps i) and iv) may be carried out by tangentially feeding the portions 112a, 112b of the belt strips both at the top of the drums 13 and 14.

With reference to the above-described plant 1, a method according to the invention for manufacturing a belt package and a crown structure of a green tire, will now be illustrated.

In an initial step, the belt structure assembled on the assembly drum 13 or 14 placed in the assembling position aligned with the belt 12, is picked up by the first transfer device 17 and transferred to the third assembly drum 18.

In a subsequent step, a layer of rubber mixture having a predetermined width and including a plurality of circumferentially oriented reinforcing cords 104, i.e. zero degree cords, is coaxially formed on the belt structure supported by the third assembly drum 18.

Preferably, this reinforcing layer has a width substantially equal to the width of the belt structure and is obtained by spirally winding the tape 103, which is fed in a substantially continuous manner by the production line 3, around the belt structure.

As illustrated above, the tape 103 is extruded in a substantially continuous manner by the extrusion head 22, cooled by the rolls 23 and cut to size at the end of the assembling step on the belt structure by a head with a pneumatic shear cutting mechanism (not shown), so as to obtain the belt package.

The method for manufacturing the crown structure comprises an additional step wherein a plurality of treads 105 are prepared in a substantially continuous manner by cutting the substantially continuous tread sheet 114 of rubber mixture in portions having a predetermined length along the cooled conveyor belt 26.

As illustrated above, the tread 105 is extruded in the form of a continuous tread sheet 114 from the extrusion head 25 and transported by means of the conveyor belt 26 on which the sheet 114 is cut to size by a shearer, conventional per se and not shown.

In a subsequent step, the tread 105 thus obtained is coaxially applied onto the belt package prepared on the assembly drum, possibly with the help of pressing rolls or other means adapted to facilitate the implementation of this step.

Subsequently, the assembly drum 18 is moved by the positioning device 46 from the assembling position D of the belt package and of the crown structure to the picking-up position G of the crown structure by means of the second transfer ring 60.

Finally, transfer ring 60 transfers the crown structure thus assembled onto the assembly drum, not shown, where the green tire is completed by assembling the crown structure to a previously prepared tire carcass obtained by assembling together the other semi-finished products (liner, carcass structure, sidewalls, beads, and so on) by means of a shaping operation of the carcass.

FIGS. 14–21 schematically illustrate additional embodiments of the plant 2 for manufacturing the belt structure according to the invention.

In the following description and in said figures, the elements of the plant 2 for manufacturing the belt structure structurally or functionally equivalent to those previously illustrated with reference to FIGS. 1–13 will be indicated by the same reference numbers and will not be further described.

In an alternative embodiment of the plant 2 illustrated in FIGS. 14–17, the transfer device 27 of the strips 108 includes a strip-conveying belt 62 adapted to convey the strips along a conveying axis N—N parallel to the cutting direction of the sheet 109 of rubber-coated fabric. Said belt 62 carries out the same function of the multiple arm carousel 57 of the first embodiment.

The plate 50 carries out both the function of dragging the sheet 109 of rubber-coated fabric for a distance having a predetermined length (equal to the length of the strip to be obtained) past the first cutting device 32, and the function of releasing the strip 108 thus obtained onto the belt 62.

Figure 14:
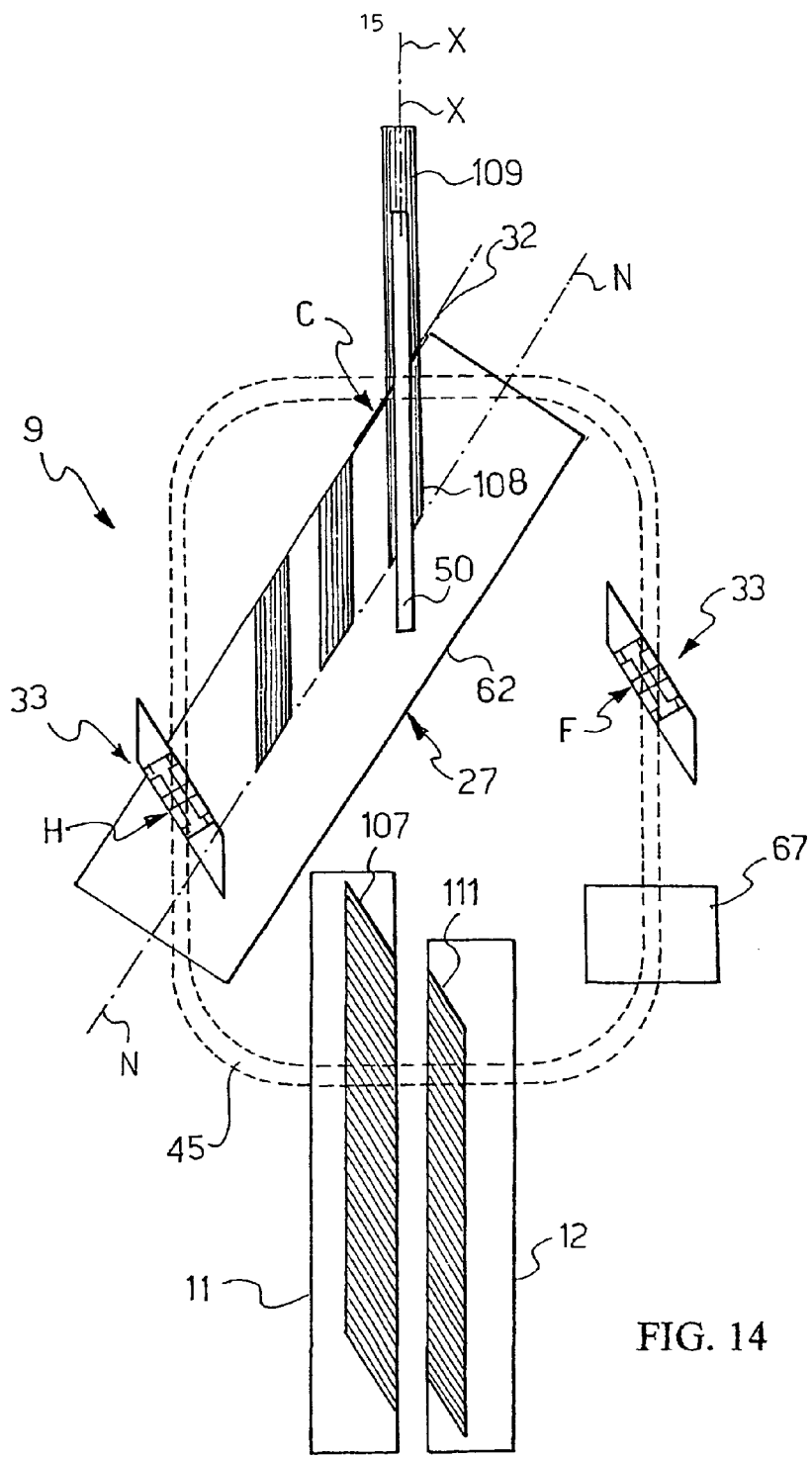
FIG. 14 is a schematic top view, in an enlarged scale, of an alternative embodiment of the half-strips preparation device intended for forming the belt strips.
Figure 14:
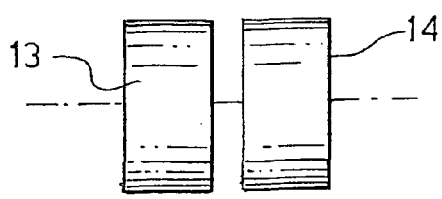
Figure 15:
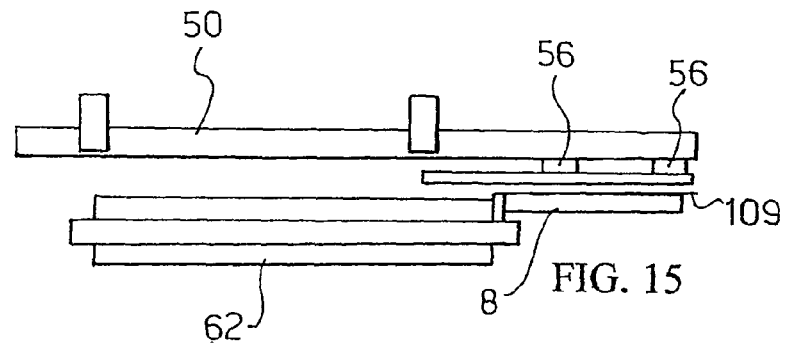
FIGS. 15 and 16 are schematic views of operative conditions of catching means of a continuous sheet of rubber-coated fabric provided for upstream and cooperating with the half-strips preparation device of FIG. 14.
Figure 16:
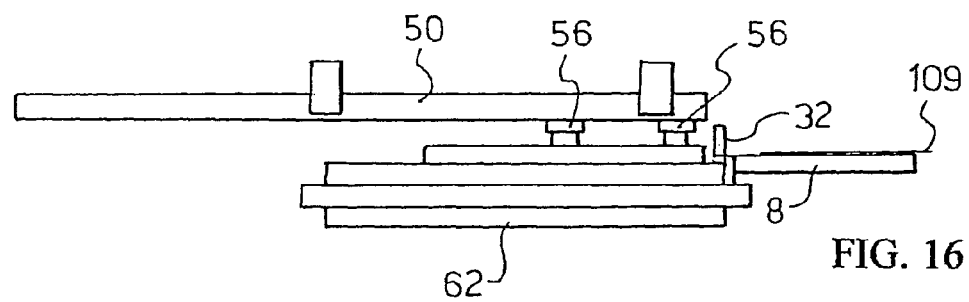
Figure 17:
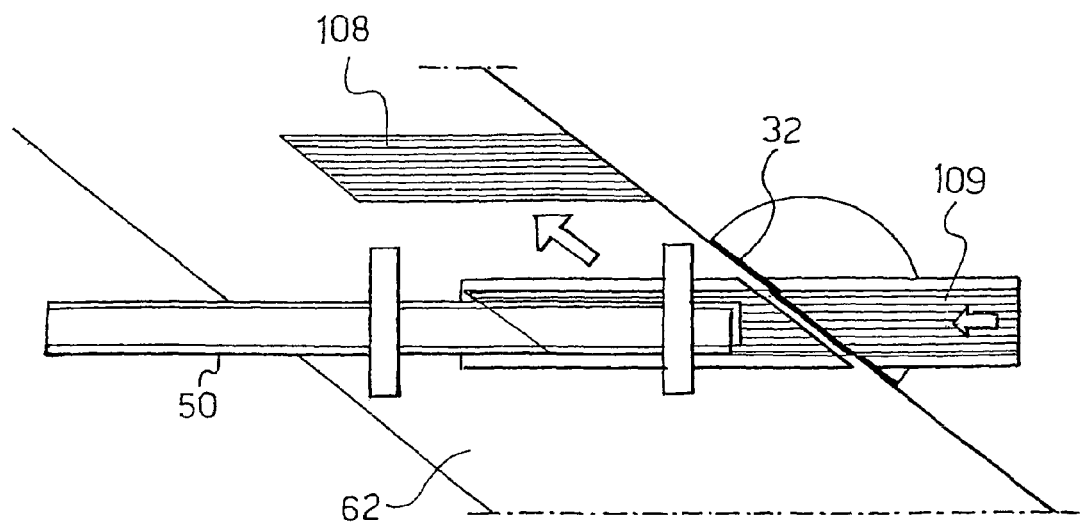
FIG. 17 is a schematic top view of the catching means illustrated in FIGS. 15 and 16.

The belt 62 then transfers the strip 108 away from the direction X—X, as illustrated in FIG. 14, shifting the same in a picking-up position H at which the strip 108 will be subsequently picked up by the positioning device 33 of the half-strips.

The half-strips 107 in excess will be released by said device 33 in the collection container 67 (FIG. 14).

In an additional embodiment of the plant 2, not shown, the above-mentioned strip catching means 36 of the positioning device 33 of the half-strips includes a pair of coplanar plates, for example of magnetic type, slidably mounted on a supporting beam without the help of a pair of slides.

With reference to the above-mentioned plant, a method according to the invention for manufacturing a belt structure may be carried out in the following way.

The strip 108, released by the plate 50 on the belt 62 after cutting the sheet 109 of rubber-coated fabric, is transported by the belt 62 along the direction N—N. This operation enables to transfer the strip 108 to a suitable picking-up position H by the positioning device 33 of the half-strips. This positioning device 33 picks up the strip 108 lying on the belt 62 at the picking-up position H and transports the strip to the required cutting position F, optionally rotating the strip 108 of a predetermined angle γ with respect to the direction X—X.

It should be noted that the value of the angle γ may also be equal to 0° depending upon the orientation assumed by the strip 108 in the picking-up position H and upon the cutting direction of the strip.

In a step following the cutting operation of the strip 108 in two half-strips 107, 111, the latter are suitably moved away from each other along a direction substantially perpendicular to the cutting direction by means of the plates 38a, 38b of the positioning device 33 of the half-strips.

Subsequently, the half-strips 107 and 111 thus moved away are released by said device 33, upon demagnetization of the plates 38a, 38b, respectively on conveyor belts 11 and 12.

In a subsequent step of the method and similarly to what has been described in the first embodiment of the method according to the invention, the half-strips 107, 110 are butt spliced to each other by approaching the edges of adjacent half-strips thanks to a longitudinal traction exerted along the facing edges of the half-strips by the rolls or by the jaws of the splicing device movably supported above the conveyor belts 11 and 12.

Also in this case, the final steps of the method for manufacturing the belt structure involve the superposing of the portions 112a, 112b obtained from the belt strips 113a and 113b on the assembly drums 13 and 14 in a manner similar to what has been previously described.

In a further and advantageous embodiment, the method according to the invention involves the preparation of belt strips 113a, 113b having reinforcing cords 106 having the same inclination with respect to the respective conveying directions Y—Y, Z—Z. In this case, the portions of belt strips 112a, 112b assume the desired configuration in which the cords 106 are inclined in opposite direction with respect to that of the cords of the adjacent strip by suitably feeding the portions of the strips 112a, 112b towards the assembly drums 13, 14.

Figure 20:
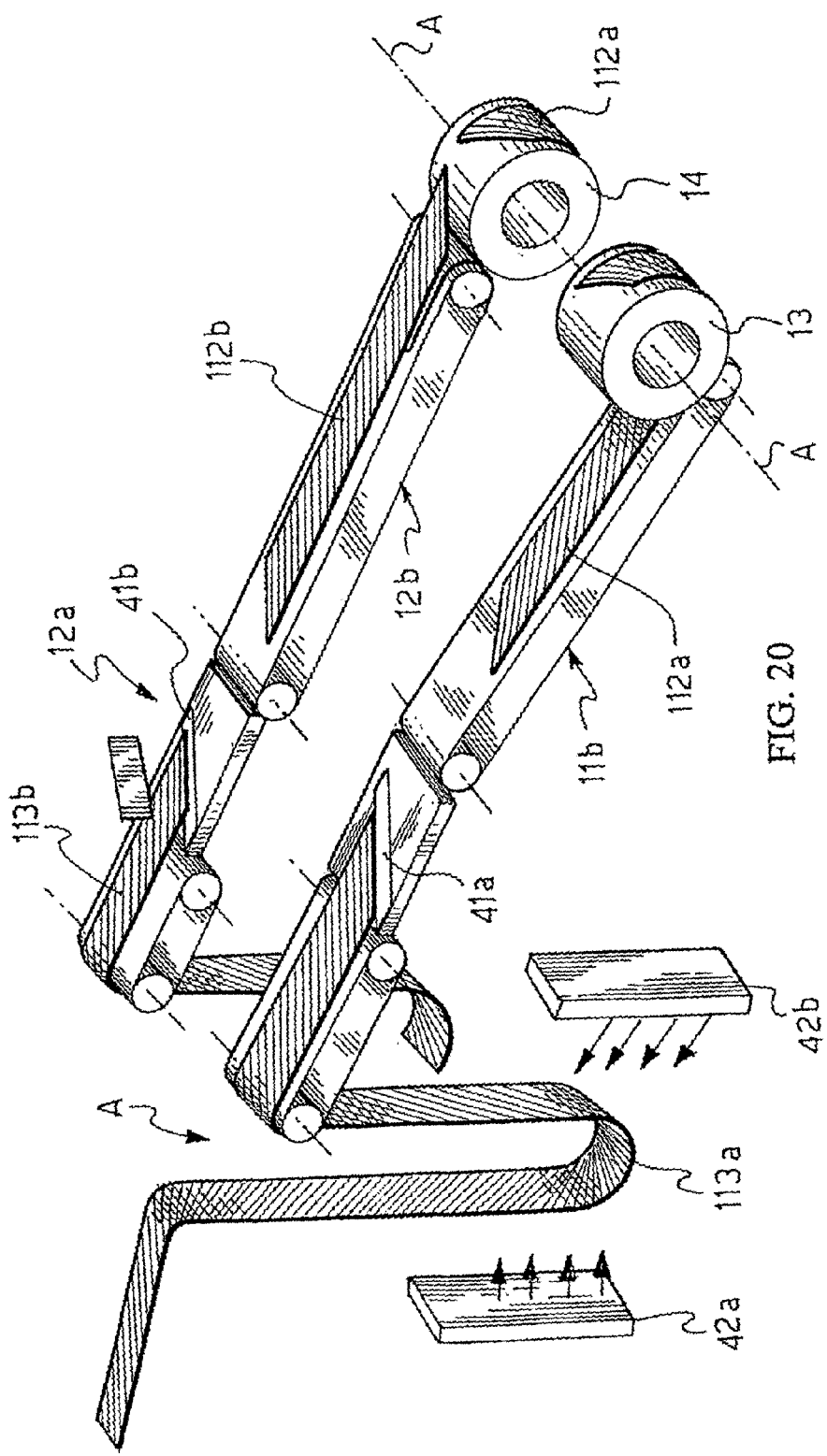
FIG. 20 is a schematic perspective view of an alternative embodiment of the conveying and cutting means of the belt strips and of a pair of assembly drums.

In this case, the downstream section of one of the conveyor belts 11 and 12, for example the section 11b of the conveyor belt 11, assumes—unlike the alternative embodiment of the plant 2 previously described—an inclination which enables a tangential supply of the portion of belt strip 112a at the bottom of the assembly drum 13 (FIG. 20). The portion of belt strip 112b, on the other hand, is tangentially fed at the top of the assembly drum 14.

Figure 21:
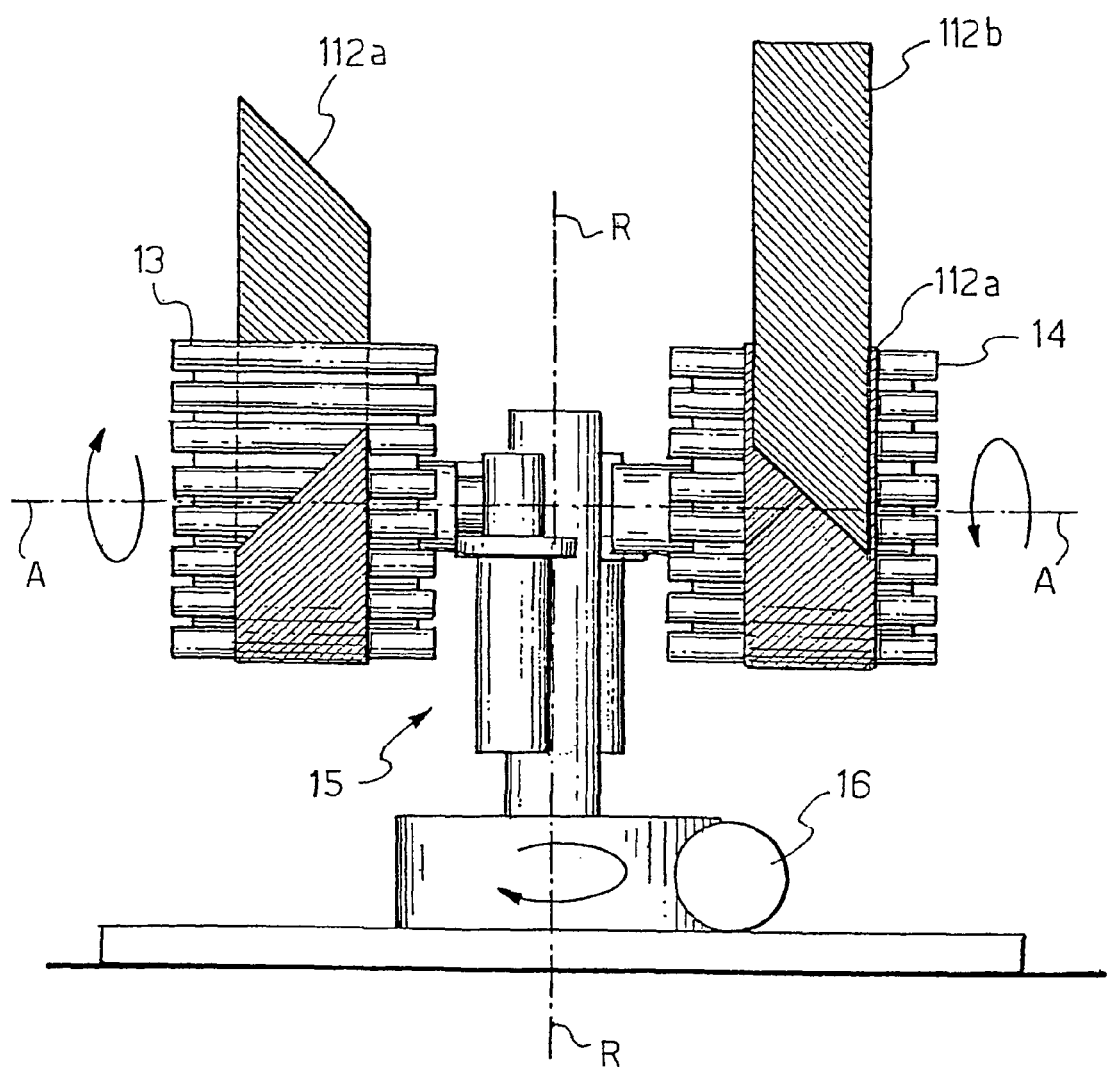
FIG. 21 is an elevational view of a device for supporting and angularly positioning the assembly drums of FIG. 20.

The assembling step of the strip portions 112a, 112b to form the belt structure, is therefore carried out in the following way, as shown in FIG. 21:

i) applying the radially inner belt strip portion 112a on the first assembly drum 13, by tangentially feeding the strip portion 112a at the bottom of the drum 13 and by rotating the drum 13 in a first direction of rotation about the axis A—A;

ii) switching the two drums 13 and 14 with one another by rotating of 180° the device 15 for supporting and angularly positioning the drums about the axis R—R perpendicular to the rotation axis A—A of the above-mentioned drums;

iii) applying the radially outer belt strip portion 112b on the radially inner belt strip portion 112a, in a tangential manner and at the top of the drum 13, thereby forming the belt structure on the drum located in the above-mentioned assembling position by rotating the drum 13 around the axis A—A in the opposite direction with respect to the above-mentioned first direction of rotation, iv) applying a new radially inner belt strip portion 112a on the second assembly drum 14, by tangentially feeding the strip portion 112a at the bottom of the drum 14 and by rotating the drum 14 about the axis A—A in the above-mentioned first direction of rotation, and v) cyclically repeating steps i) to iv).

The method and the plant 9 according to the invention may include an additional advantageous variant in which the splicing methods of the half-strips 107 and 110 enable to form the belt strips 113a, 113b while reducing as much as possible the strains exerted in longitudinal direction on the elastomeric material being processed and this independently of the inclination that the reinforcing cords 106 of the belt strips 113a, 113b may have with respect to the respective conveying directions Y—Y, Z—Z.

Purely as an illustrative and non limiting example, this variant is illustrated with reference to the embodiment wherein the belt strips 113a, 113b having reinforcing cords 106 presenting the same inclination with respect to the respective conveying directions Y—Y, Z—Z are prepared.

More particularly, in this additional embodiment of the plant 2, the extrusion head 7 may be provided with a suitably shaped die adapted to form a sheet 109 of rubber-coated fabric having a lip 70 made of elastomeric material and having a suitable width.

Figure 18:
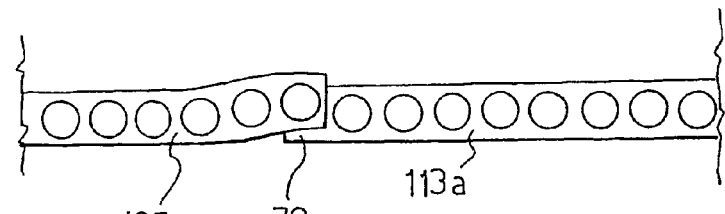
FIG. 18 is an enlarged scale partial schematic view of the belt strip, illustrating the butt splicing between adjacent half-strips at a lip extending from one of the latter.

Thanks to this structural feature of the sheet 109 of rubber-coated fabric, it is possible to obtain (by carrying out the previously illustrated cutting and handling operations) a plurality of half-strips 107, 110 provided—at one of the edges to be spliced—with a respective lip 70 only made of elastomeric material (FIG. 18).

In this embodiment, a seat for receiving with a substantially mating engagement the edge of an adjacent strip 107, 110 is defined above the lip 70, which seat facilitates the butt splicing of the half-strips with the formation in a substantially continuous manner of the belt strips 113a, 113b.

Figure 19:
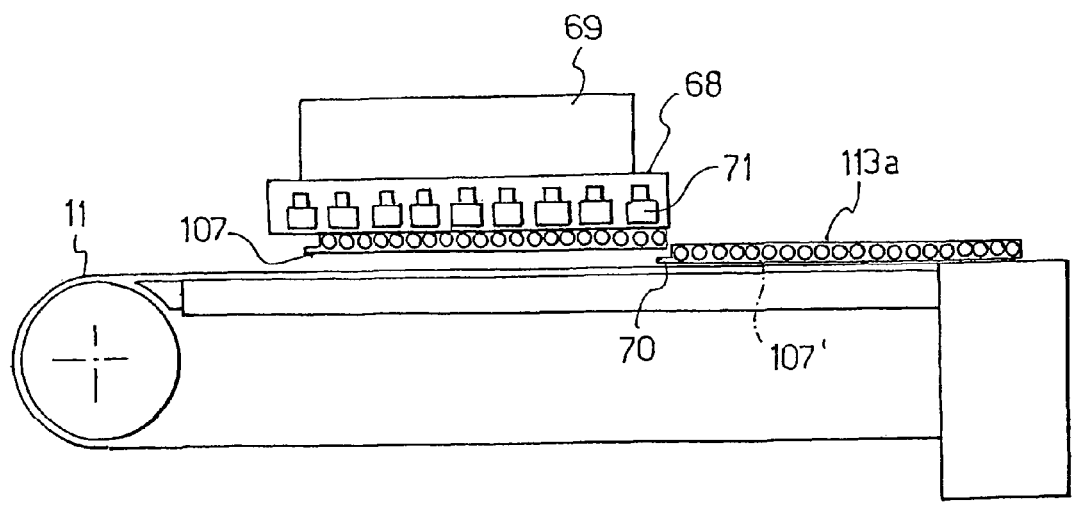
FIG. 19 is a schematic elevational view of a preferred embodiment of a splicing device of the half-strips and a conveyor belt for conveying the belt strip obtained by the above-mentioned half-strips.

Conveniently, the butt splicing devices of the half-strips 107 and 110—indicated at 69 in FIG. 19—include in this case a plate 68 of suitable size and weight, movably supported above the conveyor belts 11, 12. The plate 68 picks up each half-strip, for example the half-strip 107, by means of a plurality of magnets 71 and places the half-strip at the free end of the belt strip 113a being formed on the conveyor belt 11.

In this case, the splicing is carried out by the plate 68 which, by pressing on the entire top surface of each half-strip 107 to be spliced, promotes the engagement and the union by pressure of the edge of the half-strip 107 with the lip 70 of the adjacent half-strip 107' already belonging to the belt strip 113a being formed.

Advantageously, the butt splicing between subsequent half-strips 107, 110 (or, better, between a structurally independent half-strip and the free end of the belt strip 113a or 113b being formed) takes place by exerting a pressure in a direction substantially perpendicular to the lying plane of the belt strip 113a or 113b thanks to the action of the plate 68 movably supported above the conveyor belts 11 and 12.

Thanks to these features, it is therefore possible to prepare the belt strips 113a, 113b while reducing as much as possible the strains exerted in longitudinal direction on the elastomeric material being processed, thereby reducing as much as possible any stress or deformation which may have a negative influence on the quality of the belt structure thus produced.

From what it has been described and illustrated above, all the advantages achieved by the invention and especially those related to the possibility of assembling a belt structure, a belt package and a crown structure in an essentially automatic manner with minimum labor and ensuring a constant and high quality of these products, are immediately apparent.

A man skilled in the art may carry out modifications and variants to the above-described invention in order to fulfill specific and contingent applicative requirements, variants and modifications anyhow falling within the scope defined by the subsequent claims.

In this way, for example, the half-strips preparation device 9 may be constituted by one or more automated units suitably programmed to pick up the strips 108 from the receiving position C downstream of the cutting means 32, to transfer the strips to a suitable cutting device and to release the half-strips thus obtained, after having turned upside down one of the latter, on the belts 11 and 12 or other suitable conveying means, wherein the belt strips 113a and 113b are subsequently assembled.

What is claimed is:

1. A method for manufacturing a belt structure for a vehicle tire, comprising:
preparing, in a substantially continuous manner, a plurality of strips along a predetermined conveying direction;
preparing, in a substantially continuous manner, a plurality of half-strips by cutting each of the strips along a predetermined cutting direction;
butt splicing, in a substantially continuous manner, respective half-strips to form belt strips;
moving, in a substantially continuous manner, the belt strips toward at least one assembly drum; and
superposing, on the at least one assembly drum, portions of each of the belt strips to form a belt structure;

wherein each strip comprises a first predetermined length extending along the predetermined conveying direction, wherein the half-strips comprise a second predetermined length, wherein the half-strips are aligned along respective conveying directions, wherein each half-strip incorporates reinforcing cords substantially parallel to one another, wherein the belt strips extend along the respective conveying directions, wherein the belt-strip portions comprise respective predetermined lengths, wherein the belt structure comprises radially superposed belt-strip portions, wherein reinforcing cords in each belt-strip portion are substantially parallel to one another, and wherein, relative to an equatorial plane of the belt structure, the reinforcing cords in a first belt-strip portion are inclined in an opposite direction with respect to the reinforcing cords in a radially adjacent belt-strip portion.

2. The method of claim 1, further comprising:

cutting a sheet of rubber-coated fabric along a first cutting direction forming a first predetermined angle with respect to the predetermined conveying direction to form the plurality of strips;

transferring each strip to a cutting position away from the predetermined conveying direction;

cutting each strip along a second cutting direction to form two half-strips; and moving the two half-strips away from each other along a direction substantially perpendicular to the second cutting direction;

wherein the sheet incorporates reinforcing cords substantially parallel to one another, and wherein the second cutting direction forms a second predetermined angle with respect to a longitudinal axis of each strip.

3. The method of claim 2, further comprising:

turning one of the two half-strips upside down, so that, relative to the equatorial plane of the belt structure, reinforcing cords in a first half-strip are inclined in an opposite direction with respect to reinforcing cords in a corresponding second half-strip.

4. The method of claim 1, wherein the half-strips are butt spliced on conveying means arranged along the respective conveying directions.

5. The method of claim 4, wherein the belt strips are moved toward the at least one assembly drum by the conveying means.

6. The method of claim 1, wherein superposing portions of each of the belt strips comprises:

cutting out a portion of a first belt strip, the portion of the first belt strip comprising a length substantially equal to a circumferential development of a first assembly drum;

cutting out a portion of a second belt strip, the portion of the second belt strip comprising a length substantially equal to the circumferential development of the first assembly drum;

applying the portion of the first belt strip on the first assembly drum;

rotating a device for supporting and angularly positioning the at least one assembly drum to reposition the first assembly drum; and applying the portion of the second belt strip on the portion of the first belt strip to form the belt structure.

7. The method of claim 1, wherein superposing portions of each of the belt strips comprises:

cutting out a portion of a first belt strip, wherein the portion of the first belt strip comprises a length substantially equal to a circumferential development of a first assembly drum;

cutting out a portion of a second belt strip, wherein the portion of the second belt strip comprises a length substantially equal to the circumferential development of the first assembly drum;

applying the portion of the first belt strip on the first assembly drum;

rotating a device for supporting and angularly positioning the at least one assembly drum to reposition the first assembly drum and a second assembly drum;

applying the portion of the second belt strip on the portion of the first belt strip to form the belt structure; and repeating this groups of actions, as required, alternately on the first and second assembly drums.

8. The method of claim 1, wherein superposing portions of each of the belt strips comprises:

cutting out a portion of a first belt strip, wherein the portion of the first belt strip comprises a length substantially equal to a circumferential development of a first assembly drum;

applying the portion of the first belt strip on the first assembly drum;

rotating through 180° a device for supporting and angularly positioning the at least one assembly drum to switch positions of the first assembly drum and a second assembly drum;

cutting out a portion of a second belt strip, wherein the portion of the second belt strip comprises a length substantially equal to the circumferential development of the first assembly drum;

applying the portion of the second belt strip on the portion of the first belt strip to form the belt structure; and repeating this group of actions, as required, alternately on the first and second assembly drums;

wherein the first and second assembly drums are fixed on diametrically opposite sides of the device for supporting and angularly positioning the at least one assembly drum.

9. The method of claim 1, further comprising:

discarding one of the half-strips as a function of a length increase of one of the belt strips.

10. A plant for manufacturing a belt structure for a vehicle tire, comprising:

an extrusion apparatus to form, in substantially continuous manner, a sheet of rubber-coated fabric;

first conveying means to transport the sheet along a predetermined conveying direction;

a first device for cutting the sheet along a first cutting direction forming a first predetermined angle with respect to the predetermined conveying direction to form multiple strips;

a second device for preparing, from the multiple strips, a plurality of first and second half-strips by cutting each strip into two parts along a predetermined cutting direction;

second conveying means for transporting the first and second half-strips along respective conveying directions;

a third device for butt splicing the first half-strips to each other and the second half-strips to each other to form substantially continuous belt strips on the second conveying means;

a fourth device for cutting the substantially continuous belt strips into portions; and at least one assembly drum adapted to support the belt-strip portions;

wherein the sheet incorporates reinforcing cords substantially parallel to one another, wherein the multiple strips comprise a first predetermined length extending along the predetermined conveying direction, wherein the half-strips comprise a second predetermined length, wherein the half-strips are aligned along the respective conveying directions, wherein each half-strip incorporates reinforcing cords substantially parallel to one another, and wherein the belt-strip portions comprise respective predetermined lengths.

11. The plant of claim 10, wherein the extrusion apparatus comprises:

an extrusion head for supplying, in a substantially continuous manner, the sheet of rubber-coated fabric on the first conveying means;

wherein the reinforcing cords of the sheet are supplied by a creel supported in a vicinity of the extrusion head.

12. The plant of claim 10, wherein the second device comprises:

a fifth device;

a sixth device; and a seventh device;

wherein the fifth device moves the strips away from the first conveying means, wherein the fifth device also transfers each strip to a cutting position away from the predetermined conveying direction, wherein the sixth device cuts each strip along a second cutting direction to form the first and second half-strips, wherein the second cutting direction forms a second predetermined angle with respect to a longitudinal axis of each strip, wherein the seventh device moves the first and second half-strips away from each other along a direction substantially perpendicular to the second cutting direction, and wherein the seventh device also positions the first and second half-strips on the second conveying means.

13. The plant of claim 12, further comprising:

an eighth device for turning the first half-strips or the second half-strips upside down;

wherein the eighth device is disposed downstream of the sixth device.

14. The plant of claim 13, wherein the eighth device comprises:

a plate provided with means for catching respective half-strips;

wherein the eighth device is disposed upstream of the second conveying means of the respective half-strips, wherein the plate is rotatably mounted on a respective supporting frame, and wherein the frame is guided to and from the second conveying means of the respective half-strips.

15. The plant of claim 12, wherein the seventh device picks up each of the strips at a picking-up position and rotates each strip a third predetermined angle with respect to the predetermined conveying direction.

16. The plant of claim 15, wherein the seventh device comprises means for catching the strips, and wherein the means for catching the strips is rotatably mounted about an axis perpendicular to the strips on a supporting frame guided to and from the sixth device.

17. The plant of claim 15, wherein the seventh device comprises:

two substantially coplanar plates; and means for moving the two plates toward and away from each other;

wherein each plate is provided with means for catching the half-strips.

18. The plant of claim 12, wherein the fifth device comprises:

a carousel;

wherein the carousel comprises at least one strip-supporting arm, and wherein the at least one strip-supporting arm is angularly movable between a first strip-receiving position located downstream of the first device and a picking-up position.

19. The plant of claim 18, wherein the carousel further comprises:

a strip-supporting oscillating table hinged to the at least one strip-supporting arm;

wherein the oscillating table is movable to and from the first device.

20. The plant of claim 12, wherein the fifth device comprises:

strip-conveying means;

wherein the strip-conveying means comprises a conveying axis substantially parallel to the first cutting direction, and wherein the strip-conveying means is movable between a strip-receiving position, located downstream of the first device, and a picking-up position.

21. A method for manufacturing a belt package for a vehicle tire, comprising:

preparing, in a substantially continuous manner, a plurality of strips along a predetermined conveying direction;

preparing, in a substantially continuous manner, a plurality of half-strips by cutting each of the strips along a predetermined cutting direction;

butt splicing, in a substantially continuous manner, respective half-strips to form belt strips;

moving, in a substantially continuous manner, the belt strips toward at least one assembly drum;

superposing, on the at least one assembly drum, portions of each of the belt strips to form a belt structure;

transferring the belt structure to a separate assembly drum; and coaxially forming on the belt structure, supported by the separate assembly drum, a layer of rubber mixture comprising a plurality of circumferentially oriented reinforcing cords;

wherein each strip comprises a first predetermined length extending along the predetermined conveying direction, wherein the half-strips comprise a second predetermined length, wherein the half-strips are aligned along respective conveying directions, wherein each half-strip incorporates reinforcing cords substantially parallel to one another, wherein the belt strips extend along the respective conveying directions, wherein the belt-strip portions comprise respective predetermined lengths, wherein the belt structure comprises radially superposed belt-strip portions, wherein reinforcing cords in each belt-strip portion are substantially parallel to one another, wherein, relative to an equatorial plane of the belt structure, the reinforcing cords in a first belt-strip portion are inclined in an opposite direction with respect to the reinforcing cords in a radially adjacent belt-strip portion, and wherein the layer of rubber mixture comprises a width substantially equal to a width of the belt structure.

22. The method of claim 21, wherein the layer of rubber mixture is formed by applying a ribbon of rubber mixture comprising a predetermined width on the belt structure, and wherein the ribbon is coextruded in a substantially continuous manner with a plurality of reinforcing cords prealigned along a direction parallel to an extrusion direction of the ribbon.

23. The method of claim 21, wherein the layer of rubber mixture is formed by spirally winding on the belt structure at least one tape of rubber mixture incorporating one or more circumferentially oriented reinforcing cords.

24. A plant for manufacturing a belt package for a vehicle tire, comprising:

a first extrusion apparatus to form, in a substantially continuous manner, a sheet of rubber-coated fabric;

first conveying means to transport the sheet along a predetermined conveying direction;

a first device for cutting the sheet along a first cutting direction forming a first predetermined angle with respect to the predetermined conveying direction to form multiple strips;

a second device for preparing, from the multiple strips, a plurality of first and second half-strips by cutting each strip into two parts along a predetermined cutting direction;

second conveying means for transporting the first and second half-strips along respective conveying directions;

a third device for butt splicing the first half-strips to each other and the second half-strips to each other to form substantially continuous belt strips on the second conveying means;

a fourth device for cutting the substantially continuous belt strips into portions;

at least one assembly drum adapted to support the belt-strip portions;

a second extrusion apparatus to form, in a substantially continuous manner, a ribbon or tape of rubber mixture incorporating a plurality of reinforcing cords substantially parallel to one another;

means for cutting the ribbon or tape of rubber mixture into portions having predetermined length;

a separate assembly drum; and a device for transferring a belt structure comprising at least two of the belt-strip portions toward the separate assembly drum;

wherein the sheet of rubber-coated fabric incorporates reinforcing cords substantially parallel to one another, wherein the multiple strips comprise a first predetermined length extending along the predetermined conveying direction, wherein the half-strips comprise a second predetermined length, wherein the half-strips are aligned along the respective conveying directions, wherein each half-strip incorporates reinforcing cords substantially parallel to one another, and wherein the belt-strip portions comprise respective predetermined lengths.

25. The plant of claim 24, wherein the second extrusion apparatus comprises an extrusion head.

26. A method for manufacturing a crown structure for a vehicle tire, comprising:

preparing, in a substantially continuous manner, a plurality of strips along a predetermined conveying direction;

preparing, in a substantially continuous manner, a plurality of half-strips by cutting each of the strips along a predetermined cutting direction;

butt splicing, in a substantially continuous manner, respective half-strips to form belt strips;

moving, in a substantially continuous manner, the belt strips toward at least one assembly drum;

superposing, on the at least one assembly drum, portions of each of the belt strips to form a belt structure;

transferring the belt structure to a separate assembly drum;

coaxially forming on the belt structure, supported by the separate assembly drum, a layer of rubber mixture comprising a plurality of circumferentially oriented reinforcing cords;

providing, in a substantially continuous manner, a tread by cutting a substantially continuous tread sheet of rubber mixture into portions having predetermined length; and coaxially applying the tread on the layer of rubber mixture;

wherein each strip comprises a first predetermined length extending along the predetermined conveying direction, wherein the half-strips comprise a second predetermined length, wherein the half-strips are aligned along respective conveying directions, wherein each half-strip incorporates reinforcing cords substantially parallel to one another, wherein the belt strips extend along the respective conveying directions, wherein the belt-strip portions comprise respective predetermined lengths, wherein the belt structure comprises radially superposed belt-strip portions, wherein reinforcing cords in each belt-strip portion are substantially parallel to one another, wherein, relative to an equatorial plane of the belt structure, the reinforcing cords in a first belt-strip portion are inclined in an opposite direction with respect to the reinforcing cords in a radially adjacent belt-strip portion, and wherein the layer of rubber mixture comprises a width substantially equal to a width of the belt structure.

27. The method of claim 26, wherein the tread is formed by extrusion in a substantially continuous manner.

28. A plant for manufacturing a crown structure for a vehicle tire, comprising:

a first extrusion apparatus to form, in a substantially continuous manner, a sheet of rubber-coated fabric;

first conveying means to transport the sheet along a predetermined conveying direction;

a first device for cutting the sheet along a first cutting direction forming a first predetermined angle with respect to the predetermined conveying direction to form multiple strips;

a second device for preparing, from the multiple strips, a plurality of first and second half-strips by cutting each strip into two parts along a predetermined cutting direction;

second conveying means for transporting the first and second half-strips along respective conveying directions;

a third device for butt splicing the first half-strips to each other and the second half-strips to each other to form substantially continuous belt strips on the second conveying means;

a fourth device for cutting the substantially continuous belt strips into portions;

at least one assembly drum adapted to support the belt-strip portions;

a second extrusion apparatus to form, in a substantially continuous manner, a ribbon or tape of rubber mixture incorporating a plurality of reinforcing cords substantially parallel to one another;

first means for cutting the ribbon or tape of rubber mixture into portions having predetermined length;

a separate assembly drum;

a device for transferring a belt structure comprising at least two of the belt-strip portions toward the separate assembly drum;

a third extrusion apparatus to form, in a substantially continuous manner, a continuous tread sheet of rubber mixture;

third conveying means for transferring the continuous tread sheet of rubber mixture toward the separate assembly drum; and second means for cutting the continuous tread sheet of rubber mixture into portions having predetermined length to form a tread;

wherein the sheet of rubber-coated fabric incorporates reinforcing cords substantially parallel to one another, wherein the multiple strips comprise a first predetermined length extending along the predetermined conveying direction, wherein the half-strips comprise a second predetermined length, wherein the half-strips are aligned along the respective conveying directions, wherein each half-strip incorporates reinforcing cords substantially parallel to one another, and wherein the belt-strip portions comprise respective predetermined lengths.

29. The plant of claim 28, wherein the third conveying means is provided with cooling means.

* * * * *